(12) United States Patent
McBryde et al.

(10) Patent No.: US 9,871,404 B2
(45) Date of Patent: *Jan. 16, 2018

(54) EMERGENCY LIGHTING DEVICES WITH LED STRINGS

(71) Applicant: Cree, Inc., Durham, NC (US)

(72) Inventors: James Andrew McBryde, Raleigh, NC (US); Jason Taylor, Cary, NC (US)

(73) Assignee: Cree, Inc., Durham, NC (US)

( * ) Notice: Subject to any disclaimer, the term of this patent is extended or adjusted under 35 U.S.C. 154(b) by 333 days.

This patent is subject to a terminal disclaimer.

(21) Appl. No.: 13/676,791

(22) Filed: Nov. 14, 2012

(65) Prior Publication Data

US 2013/0147397 A1    Jun. 13, 2013

Related U.S. Application Data

(63) Continuation-in-part of application No. 13/466,304, filed on May 8, 2012, and a continuation-in-part of
(Continued)

(51) Int. Cl.
*H02J 9/02* (2006.01)
*H05B 41/46* (2006.01)
(Continued)

(52) U.S. Cl.
CPC .............. *H02J 9/02* (2013.01); *H02J 7/0018* (2013.01); *H05B 33/0827* (2013.01);
(Continued)

(58) Field of Classification Search
CPC .............................. H05B 41/46; H02J 7/0018
(Continued)

(56) References Cited

U.S. PATENT DOCUMENTS 3,283,169 A    11/1966  Libaw
4,210,846 A     7/1980  Capewell et al.
(Continued)

FOREIGN PATENT DOCUMENTS

CN         1056950 C     9/2000
CN       101725848 A     6/2010
(Continued)

OTHER PUBLICATIONS

EETimes, 'Controlling power and cost for multiple LEDs', Johnson, Brant, Texas Instruments, Nov. 6, 2006*
(Continued)

*Primary Examiner* — Thuy Vinh Tran
(74) *Attorney, Agent, or Firm* — Myers Bigel, P.A.

(57) ABSTRACT

Emergency lighting devices and methods are disclosed. An emergency lighting device includes a first group of solid state emitters configured to emit light of a first color. The emergency lighting device also includes a second group connected in series to the first group and configured to emit a second color. The groups are configured to receive a normal operation current from an LED driver at the input end of the first group and output the normal operation current at the output end of the second group. In an emergency, the first group receives an emergency operation current from an emergency LED driver at an emergency input and outputs the emergency operation current at an emergency output located.

28 Claims, 14 Drawing Sheets

Related U.S. Application Data application No. 13/466,312, filed on May 8, 2012, now Pat. No. 9,560,703, and a continuation-in-part of application No. 13/466,324, filed on May 8, 2012, now Pat. No. 8,823,272.

(60) Provisional application No. 61/569,588, filed on Dec. 12, 2011.

(51) Int. Cl.
*H02J 7/00* (2006.01)
*H05B 33/08* (2006.01)
*F21S 9/02* (2006.01)
*F21Y 115/10* (2016.01)
*F21Y 113/13* (2016.01)

(52) U.S. Cl.
CPC ......... *H05B 33/0842* (2013.01); *H05B 41/46* (2013.01); *F21S 9/022* (2013.01); *F21Y 2113/13* (2016.08); *F21Y 2115/10* (2016.08)

(58) Field of Classification Search
USPC .......................... 315/86; 307/64, 65; 340/333
See application file for complete search history.

(56) References Cited

U.S. PATENT DOCUMENTS

| | | | |
|---|---|---|---|
| 4,213,064 | A | 7/1980 | Nagano |
| 4,392,089 | A | 7/1983 | Lester et al. |
| 4,506,195 | A | 3/1985 | Elms |
| 4,540,917 | A | 9/1985 | Luchaco et al. |
| 4,560,908 | A | 12/1985 | Stupp et al. |
| 4,682,147 | A | 7/1987 | Bowman |
| 4,890,004 | A | 12/1989 | Beckerman |
| 5,151,679 | A | 9/1992 | Dimmick |
| 5,404,082 | A | 4/1995 | Hernandez et al. |
| 5,408,403 | A | 4/1995 | Nerone et al. |
| 5,466,992 | A | 11/1995 | Nemirow |
| 5,488,269 | A | 1/1996 | El-Hamamsy et al. |
| 5,598,326 | A | 1/1997 | Liu et al. |
| 5,734,230 | A | 3/1998 | Edwards et al. |
| 5,739,639 | A | 4/1998 | Johnson |
| 5,808,417 | A | 9/1998 | Ference et al. |
| 5,847,550 | A | 12/1998 | Schie et al. |
| 5,895,986 | A | 4/1999 | Walters et al. |
| 5,925,990 | A | 7/1999 | Crouse et al. |
| 6,051,938 | A | 4/2000 | Arts et al. |
| 6,069,453 | A | 5/2000 | Arts et al. |
| 6,124,678 | A | 9/2000 | Bishop et al. |
| 6,320,330 | B1 | 11/2001 | Haavisto et al. |
| 6,333,605 | B1 | 12/2001 | Grouev et al. |
| 6,362,575 | B1 | 3/2002 | Chang et al. |
| 6,411,045 | B1 | 6/2002 | Nerone |
| 6,507,157 | B1 | 1/2003 | Erhardt et al. |
| 6,509,657 | B1 | 1/2003 | Wong et al. |
| 6,822,426 | B1 | 11/2004 | Todd et al. |
| 7,027,010 | B2 | 4/2006 | Lee |
| 7,067,992 | B2 | 6/2006 | Leong |
| 7,088,059 | B2 | 8/2006 | McKinney et al. |
| 7,138,994 | B2 | 11/2006 | Cho et al. |
| 7,511,971 | B2 | 3/2009 | Lim |
| 7,863,832 | B2 | 1/2011 | Lane et al. |
| 7,911,149 | B2 | 3/2011 | Schaible et al. |
| 8,089,213 | B2 | 1/2012 | Park |
| 8,310,172 | B2 | 11/2012 | Negrete |
| 8,322,878 | B2 | 12/2012 | Hsia |
| 8,461,794 | B2 | 6/2013 | Schrod et al. |
| 9,357,599 | B2 | 5/2016 | Tomiyama et al. |
| 2002/0101362 | A1* | 8/2002 | Nishimura ............. G08G 1/095 340/907 |
| 2003/0057888 | A1 | 3/2003 | Archenhold et al. |
| 2003/0081439 | A1* | 5/2003 | Doss et al. .................. 363/131 |
| 2003/0117084 | A1 | 6/2003 | Stack |
| 2003/0193245 | A1* | 10/2003 | Powers ................ A61N 1/3975 307/64 |
| 2003/0197477 | A1 | 10/2003 | Hsieh |
| 2004/0155627 | A1* | 8/2004 | Stanesti et al. ............... 320/127 |
| 2004/0170015 | A1* | 9/2004 | Hamrick ............. G02B 6/0068 362/230 |
| 2004/0178766 | A1* | 9/2004 | Bucur .................. H02J 7/0013 320/112 |
| 2004/0192407 | A1* | 9/2004 | Formenti ...................... 455/572 |
| 2004/0217737 | A1* | 11/2004 | Popescu ...................... 320/128 |
| 2005/0029966 | A1 | 2/2005 | Buonocunto |
| 2005/0068459 | A1 | 3/2005 | Holmes et al. |
| 2005/0082989 | A1* | 4/2005 | Jones et al. ................... 315/194 |
| 2005/0135103 | A1* | 6/2005 | Evans .................... F21S 8/035 362/276 |
| 2005/0156568 | A1* | 7/2005 | Yueh ............................ 320/128 |
| 2005/0200308 | A1 | 9/2005 | Rimmer et al. |
| 2005/0243022 | A1* | 11/2005 | Negru ............................ 345/46 |
| 2006/0038803 | A1* | 2/2006 | Miller et al. .................. 345/204 |
| 2006/0066258 | A1 | 3/2006 | Lane et al. |
| 2006/0266849 | A1 | 11/2006 | Stalder |
| 2007/0138972 | A1 | 6/2007 | Siessegger |
| 2007/0152604 | A1 | 7/2007 | Tatsumi |
| 2007/0273290 | A1 | 11/2007 | Ashdown et al. |
| 2008/0055077 | A1 | 3/2008 | Lane et al. |
| 2008/0122376 | A1* | 5/2008 | Lys .................... H05B 33/0857 315/192 |
| 2008/0224617 | A1 | 9/2008 | Keller et al. |
| 2008/0258628 | A1* | 10/2008 | Higley .................... F21S 9/022 315/86 |
| 2008/0265981 | A1* | 10/2008 | Niessen et al. ............... 327/436 |
| 2008/0276509 | A1 | 11/2008 | Yu |
| 2008/0295371 | A1 | 12/2008 | Hsu |
| 2009/0033239 | A1 | 2/2009 | Gwisdalla et al. |
| 2009/0085490 | A1 | 4/2009 | Awalt et al. |
| 2009/0128057 | A1 | 5/2009 | Valdez |
| 2009/0295776 | A1 | 12/2009 | Yu et al. |
| 2009/0296384 | A1 | 12/2009 | Van de Ven et al. |
| 2010/0020527 | A1* | 1/2010 | Fiermuga ......................... 362/20 |
| 2010/0072902 | A1* | 3/2010 | Wendt et al. .................. 315/161 |
| 2010/0079091 | A1 | 4/2010 | Deixler et al. |
| 2010/0096976 | A1 | 4/2010 | Park |
| 2010/0109560 | A1 | 5/2010 | Yu et al. |
| 2010/0135000 | A1 | 6/2010 | Smith, III et al. |
| 2010/0164399 | A1* | 7/2010 | Radermacher et al. ...... 315/294 |
| 2010/0194296 | A1 | 8/2010 | Park |
| 2010/0237840 | A1 | 9/2010 | Walter et al. |
| 2010/0244569 | A1 | 9/2010 | Chandler et al. |
| 2010/0244707 | A1* | 9/2010 | Gaines et al. ................ 315/152 |
| 2010/0244981 | A1 | 9/2010 | Gorbachov |
| 2010/0259239 | A1 | 10/2010 | Shi et al. |
| 2010/0270941 | A1 | 10/2010 | Hui |
| 2010/0271802 | A1* | 10/2010 | Recker ............... H05B 33/0803 362/20 |
| 2010/0277070 | A1 | 11/2010 | Butteris et al. |
| 2010/0301751 | A1 | 12/2010 | Chobot et al. |
| 2011/0006691 | A1 | 1/2011 | Blaha et al. |
| 2011/0043035 | A1 | 2/2011 | Yamada et al. |
| 2011/0043127 | A1 | 2/2011 | Yamasaki |
| 2011/0043136 | A1 | 2/2011 | Radermacher |
| 2011/0057572 | A1 | 3/2011 | Kit et al. |
| 2011/0062888 | A1 | 3/2011 | Bondy et al. |
| 2011/0080116 | A1* | 4/2011 | Negley ............... H05B 33/0854 315/297 |
| 2011/0109164 | A1 | 5/2011 | Mohammed Suhura et al. |
| 2011/0121654 | A1 | 5/2011 | Recker et al. |
| 2011/0121754 | A1 | 5/2011 | Shteynberg et al. |
| 2011/0121756 | A1 | 6/2011 | Thomas |
| 2011/0140611 | A1 | 6/2011 | Elek et al. |
| 2011/0140612 | A1 | 6/2011 | Mohan et al. |
| 2011/0232143 | A1* | 9/2011 | Hsu ........................ G08B 7/062 40/570 |
| 2011/0291582 | A1 | 12/2011 | Wei et al. |
| 2011/0309760 | A1 | 12/2011 | Beland et al. |
| 2012/0008315 | A1 | 1/2012 | Simon et al. |
| 2012/0153854 | A1 | 6/2012 | Setomoto et al. |
| 2012/0161666 | A1 | 6/2012 | Antony |
| 2012/0242241 | A1 | 9/2012 | Schmacht |

(56) References Cited

U.S. PATENT DOCUMENTS

| | | | |
|---|---|---|---|
| 2012/0274237 | A1 | 11/2012 | Chung et al. |
| 2012/0280637 | A1 | 11/2012 | Tikkanen et al. |
| 2012/0286668 | A1 | 11/2012 | Kondo |
| 2012/0306403 | A1 | 12/2012 | Chung et al. |
| 2012/0313520 | A1 | 12/2012 | Canter et al. |
| 2013/0049613 | A1 | 2/2013 | Reed |
| 2013/0063027 | A1 | 3/2013 | Recker et al. |
| 2013/0113390 | A1 | 5/2013 | Oh et al. |
| 2013/0119868 | A1 | 5/2013 | Saxena et al. |
| 2013/0313983 | A1 | 11/2013 | Radermacher |
| 2014/0132164 | A1 | 5/2014 | McBryde et al. |
| 2014/0152184 | A1 | 6/2014 | Tomiyama et al. |
| 2014/0203714 | A1 | 7/2014 | Zhang et al. |
| 2014/0204571 | A1 | 7/2014 | Zhang et al. |
| 2014/0300655 | A1 | 10/2014 | Kato |
| 2015/0008844 | A1 | 1/2015 | Wilson |
| 2015/0015076 | A1 | 1/2015 | Park |
| 2015/0015145 | A1 | 1/2015 | Carrigan et al. |
| 2015/0021988 | A1 | 1/2015 | Barnetson et al. |
| 2015/0048685 | A1 | 2/2015 | Wilson |
| 2015/0091463 | A1 | 4/2015 | Jin |

FOREIGN PATENT DOCUMENTS

| | | |
|---|---|---|
| CN | 101799149 | 8/2010 |
| CN | 102155644 A | 8/2011 |
| CN | 102278722 A | 12/2011 |
| EP | 2 178 345 A2 | 4/2010 |
| EP | 2 288 237 A2 | 2/2011 |
| EP | 2 432 297 A2 | 3/2012 |
| JP | 2011150852 A | 8/2011 |
| TW | 201311037 A | 3/2013 |
| WO | WO 95/22194 | 8/1995 |
| WO | WO 2009/010802 A2 | 1/2009 |
| WO | WO 2009/136322 A1 | 11/2009 |
| WO | WO 2010/127366 A2 | 11/2010 |
| WO | WO 2010/139080 A1 | 12/2010 |
| WO | WO 2011/124721 A1 | 10/2011 |
| WO | WO 2012/104800 A2 | 8/2012 |
| WO | WO 2012/110973 A1 | 8/2012 |
| WO | WO 2013/124827 A1 | 8/2013 |
| WO | WO 2014/115010 A1 | 7/2014 |

OTHER PUBLICATIONS

Texas Instruments, Johnson, Brant, 'Controlling power and cost for multiple LEDs' EE Times, Nov. 6, 2006.*
AC Film Capacitors in Connection with Mains, Jan. 7, 2009, pp. 301-303, Vishay Intertechnology, Inc., http://www.eetaiwan.com/STATIC/PDF/200903/20090304_Vishay_AN02.pdf?SOUCES=DOWNLOAD.
Capacitor-Input Filter, Dec. 12, 2011, http://en.wikipedia.org/w/index.php?title=Capacitor-input_filter&oldid=465397872.
Chan, Design of Differential Filters for High-Speed Signal Chains, Application Report SLWA053B, Apr. 2010, http://www.ti.com/lit/an/slwa053b/slwa053b.pdf.
Chen, A Driving Technology for Retrofit LED Lamp for Fluorescent Lighting Fixtures with Electronic Ballasts, pp. 588-601, IEEE Trans. on Power Electronics, vol. 26:2.
Galvanic Isolation, Sep. 12, 2011, http://en.wikipedia.org/w/index/php?title-Galvanic_isolation&oldid=449965801.
Horowitz et al., The Art of Electronics, p. 32, 1989, Cambridge University Press, Cambridge.
Impedance Matching, Nov. 16, 2012, http://en.wikipedia.org/w/index.php?title=impedance_matching&oldid=523347621.
International Preliminary Report on Patentability Corresponding to International Application No. PCT/US2013/068910; dated May 28, 2015; 12 Pages.
International Preliminary Report on Patentability Corresponding to International Application No. PCT/US2013/068905; dated Aug. 6, 2015; 11 Pages.
Kuphaldt T. Lessons in Electric Circuits, vol. II-AC, Chapter 7: Mixed-Frequency AC Signals, Chapter 9: Transformers, pp. 152-188, 217-281, Jul. 25, 2007, http://www.lbiblio.org/kuphaldt/electricCircuits/AC/AC.pdf.
Lee, Robust Passive LED Driver Compatible with Conventional Rapid-Start Ballast, pp. 3694-3706, Dec. 2011, IEEE Trans. on Power Electronics, vol. 26:12.
Malvino et al. 2008, Basic Electronics (MSBTE), 3-12 Series Inductor Filter, pp. 94-95, Tata McGraw-Hill Company Limited.
Niknejad A., Electromagnetics for High-Speed Analog and Digital Communication Circuit, Chapter 7: Resoncance and Impedance Matching, Chapter 10: Transformers, pp. 168-200, 293-319, 2007, Cambridge University Press.
Pyakuryal et al., Filter Design for AC to DC Converter, vol. 2:6, pp. 42-49, Jun. 22, 2013, IRJES, http://www.irjes.com/Papers/vol2-issue6/Version-1,E02064249.pdf.
The Inductor, p. 3, Nov. 20, 2012, http://www.talkingelectronics.com/projects/inductor/inductor-3.html.
Third Party Submission Filed on Apr. 16, 2015 Corresponding to U.S. Appl. No. 13/943,455, 26 pages.
Third Party Submission Filed on Apr. 17, 2015 Corresponding to U.S. Appl. No. 14/256,573, 9 pages.
Third Party Submission Filed on Apr. 20, 2015 Corresponding to U.S. Appl. No. 13/943,455, 13 pages.
Third Party Submission Filed on Apr. 21, 2015 Corresponding to U.S. Appl. No. 13/943,455, 26 pages.
Third Party Submission Filed on Jun. 4, 2015 Corresponding to U.S. Appl. No. 14/256,573, 12 pages.
Third Party Submission Filed on Jun. 9, 2015 Corresponding to U.S. Appl. No. 13/749,082, 27 pages.
Third Party Submission Filed on May 20, 2015 Corresponding to U.S. Appl. No. 13/749,082, 14 pages.
Vitanza A. et al. Electronic Fluorescent Lamp Ballast, pp. 1-10, 1999, STMicroelectronics Application Note AN427/1294, http://www.st.com/static/acdtive/cn/resource/technical/document/application_note/CD00003901.pdf.
Zhang et al., A Capacitor-Isolated LED Driver with Inherent Current Balance Capability, pp. 1708-1716, Apr. 2012, IEEE Trans. Indust. Electronics vol. 59.
Zhu et al. "Novel Capacitor-Isolated Power Converter", pp. 1824-1829, Sep. 2010, Energy Conversion Congress and Exposition (ECCE), 2010 IEEE held in Atlanta, GA.
LED Drives for High-Brightness Lighting, Solutions Guide, national.com/LED, vol. 1, 2011, 37 pages.
Notification of Transmittal of the International Search Report and the Written Opinion of the International Searching Authority, or the Declaration, PCT/US13/68905, dated Apr. 7, 2014, 12 pages.
Notification of Transmittal of the International Search Report and the Written Opinion of the International Searching Authority, or the Declaration, PCT/US13/68910, dated Apr. 4, 2014, 13 pages.
PCT International Preliminary Report on Patentability for corresponding PCT International Application No. PCT/US2013/068910, dated May 28, 2015, 12 pages.
International Preliminary Report on Patentability corresponding to International Application No. PCT/US2012/068991; dated Jun. 17, 2014; 8 pages.
International Search Report and Written Opinion Corresponding to International Application No. PCT/US12/68987; dated Feb. 26, 2013, 14 Pages.
International Search Report Corresponding to International Application No. PCT/US2012/069126; dated Feb. 20, 2013, 17 Pages.
International Search Report Corresponding to International Application No. PCT/US12/68991; dated Mar. 4, 2013, 10 Pages.
Invitation to Pay Additional Fees Corresponding to International Application No. PCT/US12/68984; dated Feb. 1, 2013, 2 Pages.
Johnson B., "Controlling power and cost for multiple LEDs", EE Times, Nov. 5, 2006, Retrieved on Feb. 6, 2013 from URL, http://eetimes.com/design/power-management-design/4012121/Controlling-power-and-cost-for-multiple-LEDs?pageNumber
Notification of Transmittal of the International Search Report and the Written Opinion of the International Searching Authority, or the Declaration, PCT/US12/68984, May 10, 2013.

(56) References Cited

OTHER PUBLICATIONS

Office Action dated Nov. 20, 2015 for corresponding Taiwan Application No. 103135868, including English translation (19 pages).
European Search Report corresponding to European Application No. 12857833.3, dated Nov. 20, 2015 (9 Pages).
Extended European Search Report corresponding to European Application No. 12858507.2, dated Nov. 15, 2015 (7 Pages).
European Search Report Corresponding to European Patent Application No. 12 85 7535; dated Jul. 7, 2016; 8 Pages.
European Search Report Corresponding to European Patent Application No. 13 87 3105; dated Jul. 12, 2016; 7 Pages.
PCT International Preliminary Report on Patentability issued for corresponding PCT Internailonal Application No. PCT/US2014/060594, dated Apr. 28, 2016 (7 pages).
Chinese Office Action and Search Report Corresponding to Chinese Application No. 201380071244.2; dated May 23, 2016; Foreign Text, 12 Pages, English Translation Thereof, 10 Pages.
Chinese First Office Action Corresponding to Application No. 201380071192.9; dated Jun. 27, 2016; Foreign Text, 14 Pages, English Translation Thereof, 9 Pages.
European Search Report Corresponding to Application No. 13 87 2794; dated Oct. 18, 2016; 8 Pages.
Second Office Action received in corresponding Chinese Application No. 201380071192.9, dated May 12, 2017.

\* cited by examiner

EMERGENCY LIGHTING DEVICES WITH LED STRINGS

CROSS REFERENCE TO RELATED APPLICATIONS

The present application claims the benefit of and priority to U.S. Provisional Patent Application No. 61/569,588, filed Dec. 12, 2011, entitled "Emergency Lighting Systems And Methods For Solid State Lighting Apparatus," as a continuation-in-part to U.S. patent application Ser. No. 13/466,304, filed May 8, 2012, entitled "Emergency Lighting Systems And Methods For Solid State Lighting Apparatus," as a continuation-in-part to U.S. patent application Ser. No. 13/466,312, filed May 8, 2012, entitled "Dimming Control For Emergency Lighting Systems," and as a continuation-in-part to U.S. patent application Ser. No. 13/466,324, filed May 8, 2012, entitled "Emergency Lighting Systems Including Bidirectional Booster/Charger Circuits," the disclosures of which are hereby incorporated herein by reference in their entirety.

FIELD

The present application relates to emergency lighting systems, and in particular to emergency lighting systems for solid state apparatus and related methods.

BACKGROUND

Emergency lighting, sometimes referred to as egress lighting, is lighting that is activated in the event of power loss. One purpose of emergency lighting is to allow occupants of a building to safely exit the building in the event of a power outage or other emergency. Emergency lighting is mandated for use in commercial buildings by many electrical codes. Such codes generally specify the amount of light that must be provided in the event of power loss and the duration of time for which such light must be provided. For example, U.S. building codes require emergency lighting to provide one footcandle of light for a minimum of 90 minutes along the path of egress during a power outage.

In buildings, emergency lighting is commonly provided by battery-powered emergency light fixtures that are installed in a building along with the luminaires that provide light in non-emergency situations. Existing fluorescent emergency lighting systems can be configured so that the emergency ballast 12 serves the function of both providing regular illumination and emergency lighting without the need for a separate lamp ballast. Other luminaires may be used for emergency lighting, but they are limited and cannot account for differences in emergency driver specifications.

SUMMARY

Embodiments of the disclosure include emergency lighting devices and methods for operating groups of solid state emitters. According to an aspect, an emergency lighting device includes a first group of solid state emitters configured to emit light of a first color having an input end and an output end. The emergency lighting device also includes a second group of solid state emitters configured to emit light of a second color having an input end and an output end. The input end of the second group is electrically connected in series to the output end of the first group. The first group is configured to receive a normal operation current from an LED driver at the input end of the first group, and the second group is configured to output the normal operation current to the LED driver at the output end of the second group. The first group is also configured to receive an emergency operation current from an emergency LED driver at an emergency input and output the emergency operation current at an emergency output. The emergency input and the emergency output are located between the input end of the first group of solid state emitters and the output end of the second group of solid state emitters.

According to further aspects, the emergency input and the emergency output are located between the input end and the output end of the first group of solid state emitters such that the first group of solid state emitters emits light of the first color and the second group of solid state emitters emits no light such that the emergency lighting device emits light of the first color rather than a mixture of the first color and the second color.

According to further aspects, the emergency input is located between the input end of the first group of solid state emitters and the output end of the first group of solid state emitters, and wherein the emergency output is located between the input end of the second group of solid state emitters and the output end of the second group of solid state emitters.

According to another aspect, the lighting device includes a current shunt configured to shunt a current between the input end and the output end of the second group of solid state emitters such that a mixture of light emitted from the first group of solid state emitters and the second group of solid state emitters is adjusted.

According to a further aspect, the first group of solid state emitters is configured to emit a first non-white light and the second group of solid state emitters is configured to emit a second non-white light different than the first non-white light.

According to an aspect, a ratio of a number of solid state emitters of the first group of solid state emitters between the emergency input and the output of the first group of solid state emitters to a number of solid state emitters of the second group of solid state emitters between the input of the second group of solid state emitters and the emergency output is configured to emit a mixture of light of a target color.

According to a further aspect, the first group of solid state emitters is configured to emit blue shifted yellow (BSY) light, the second group of solid state emitters is configured to emit red light and the ratio is configured such that the target mixture of light is a target white color. The target color may be more of a true white color than typical "white" colors emitted by LEDs and other luminaires.

According to another aspect, a number of solid state emitters of the first group of solid state emitters between the emergency input and the output of the first group of solid state emitters and a number of solid state emitters of the second group of solid state emitters between the input of the second group of solid state emitters and the emergency output are configured based on an available emergency current output of the emergency LED driver.

According to an aspect, a normal operation current is received from an LED driver at a first group of solid state emitters and a second group of solid state emitters such that the normal operation current is input from the LED driver at the input end of the first group of solid state emitters and output at an output end of the second group of solid state emitters. Upon determination of an emergency mode, an emergency operation current is received from an emergency LED driver at an emergency input and output at an emergency output, wherein the emergency input and the emergency output are located between the input end of the first group of solid state emitters and the output end of the second group of solid state emitters.

According to further aspects, the emergency input and the emergency output are located between the input end and the output end of the first group of solid state emitters.

According to further aspects, the emergency input is located between the input end of the first group of solid state emitters and the output end of the first group of solid state emitters, and wherein the emergency output is located between the input end of the second group of solid state emitters and the output end of the second group of solid state emitters.

According to further aspects, a drop in the normal operation current is detected to determine the emergency mode. A current that is less than the normal operation current may be supplied. Receiving an emergency operation current may cause the first group of solid state emitters and the second group of solid state to maintain a color emitted with the normal operation current.

According to another aspect, a ratio first group solid state emitters to second group solid state emitters is adjusted, the ratio being a number of solid state emitters of the first group of solid state emitters between the emergency input and the output of the first group of solid state emitters to a number of solid state emitters of the second group of solid state emitters between the input of the second group of solid state emitters and the emergency output to emit a mixture of light of a target color.

According to an aspect, a number of solid state emitters of the first group of solid state emitters between the emergency input and the output of the first group of solid state emitters and a number of solid state emitters of the second group of solid state emitters between the input of the second group of solid state emitters and the emergency output are adjusted based on an available emergency current output of the emergency LED driver.

According to an aspect, an emergency lighting device includes a first group of solid state emitters configured to emit a light of a first color having an input end and an output end, a second group of solid state emitters configured to emit a light of a second color having an input end and an output end, and a third group of solid state emitters configured to emit a light of a third color having an input end and an output end. The first, second and third groups of solid state emitters are electrically connected at the input ends and the output ends to an LED driver and an emergency LED driver and a current through each of the first, second and third groups of solid state emitters is controlled by the LED driver during normal operation and controlled by the emergency LED driver in an emergency operation. The first and second colors may be the same or different. The second and third colors may be the same or different.

According to further aspects, the emergency lighting device includes a diode electrically connected between a location on the third group of solid state emitters and a location on the second group of solid state emitters. Upon determination of an emergency mode, a current from the emergency LED driver is input at an emergency location of the third group of solid state emitters and output at an emergency location of the second group of solid state emitters such that only the second group of solid state emitters and the third group of solid state emitters emit a light. The first color and the second color may be the same color. The emergency location of the second group of solid state emitters and the emergency location of the third group of solid state emitters may be configured such that the mixture of light emitted by the second group of solid state emitters and the third group of solid state emitters is a target color.

According to an aspect, the emergency lighting device further comprises a second diode electrically connected between a location on the second group of solid state emitters and a location on the first group of solid state emitters. Upon determination of a second emergency mode, a current from the emergency LED driver is input at an emergency location of the second group of solid state emitters and output at an emergency location of the first group of solid state emitters such that only the first group of solid state emitters and the second group of solid state emitters emit a light.

According to further aspects, a current through each of the first, second and third groups of solid state emitters is controlled by the LED driver during normal operation such that at least the first color and the second color mix to provide a target white color with a Color Rendering Index (CRI) of at least 80, and the third group of solid state emitters is controlled by the emergency LED driver in an emergency operation to emit a light with a CRI less than the CRI of the target white color.

According to another aspect, a normal operation current is received from an LED driver at a first group of solid state emitters, a second group of solid state emitters and a third group of solid state emitters. Upon determination of an emergency mode, an emergency operation current is received from an emergency LED driver at the first group of solid state emitters and the second group of solid state emitters such that the emergency operation current is input from the emergency LED driver at an emergency input located between the input end and the output end of the first group of solid state emitters. The emergency operation current continues through a diode electrically connecting the first group of solid state emitters to the second group of solid state emitters and is output at an emergency output located between the input end and the output end of the second group of solid state emitters.

According to a further embodiment, in an alternative emergency operation mode, an alternative emergency operation current is received from the emergency LED driver at the second group of solid state emitters and the third group of solid state emitters such that the alternative emergency operation current is input from the emergency LED driver at an alternative emergency input located between the input end and the output end of the second group of solid state emitters, continues through a second diode electrically connecting the second group of solid state emitters to the third group of solid state emitters, and is output at an alternative emergency output located between the input end and the output end of the third group of solid state emitters.

According to an aspect, a first group of solid state emitters is configured to emit a light of a first color having an input end and an output end. A second group of solid state emitters is configured to emit a light of a second color having an input end and an output end. The input end of the second group of solid state emitters is electrically coupled in series to the output end of the first group of solid state emitters and wherein the first and second groups of solid state emitters emit a mixture of light of the first color and the second color to achieve a target white color. Also, the first group of solid state emitters is configured to receive a normal operation current from an LED driver at the input end of the first group of solid state emitters, and the second group of solid state emitters is configured to output the normal operation current to the LED driver at the output end of the second group of solid state emitters. The first group of solid state emitters is configured to receive an emergency operation current from an emergency LED driver at an emergency input of the first group of solid state emitters and output the emergency operation current at an emergency output of the first group of solid state emitters. The emergency input and the emergency output are located between the input end and the output end of the first group of solid state emitters and wherein the first group of solid state emitters emits light of the first color and the second group of solid state emitters emits no light such that the emergency lighting device emits light of the first color rather than the mixture of the colors.

According to an aspect, an emergency lighting device includes a first group of solid state emitters configured to emit light of a first color having an input end and an output end and a second group of solid state emitters configured to emit light of a second color having an input end and an output end. The first group of solid state emitters and the second group of solid state emitters emit a mixture of light that is a target white color with a CRI of at least 80. A third group of solid state emitters is configured to receive an emergency operation current from an emergency LED driver and emit a light with a CRI less than the CRI of the target white color.

According to further aspects, the input end of the second group of solid state emitters is electrically connected in series to the output end of the first group of solid state emitters, wherein the first group of solid state emitters is configured to receive a normal operation current from an LED driver at the input end of the first group of solid state emitters and the second group of solid state emitters is configured to output the normal operation current to the LED driver at the output end of the second group of solid state emitters.

According to further aspects, a fourth group of solid state emitters is configured to emit a light of a fourth color having an input end and an output end, wherein the first, second and fourth groups of solid state emitters are electrically connected at the input ends to the LED driver, and wherein a current through each of the first, second and fourth groups of solid state emitters is controlled by the LED driver during normal operation such that at least two of the first, second and fourth groups of solid state emitters emit a mixture of light that is the target white color with a CRI of at least 80.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
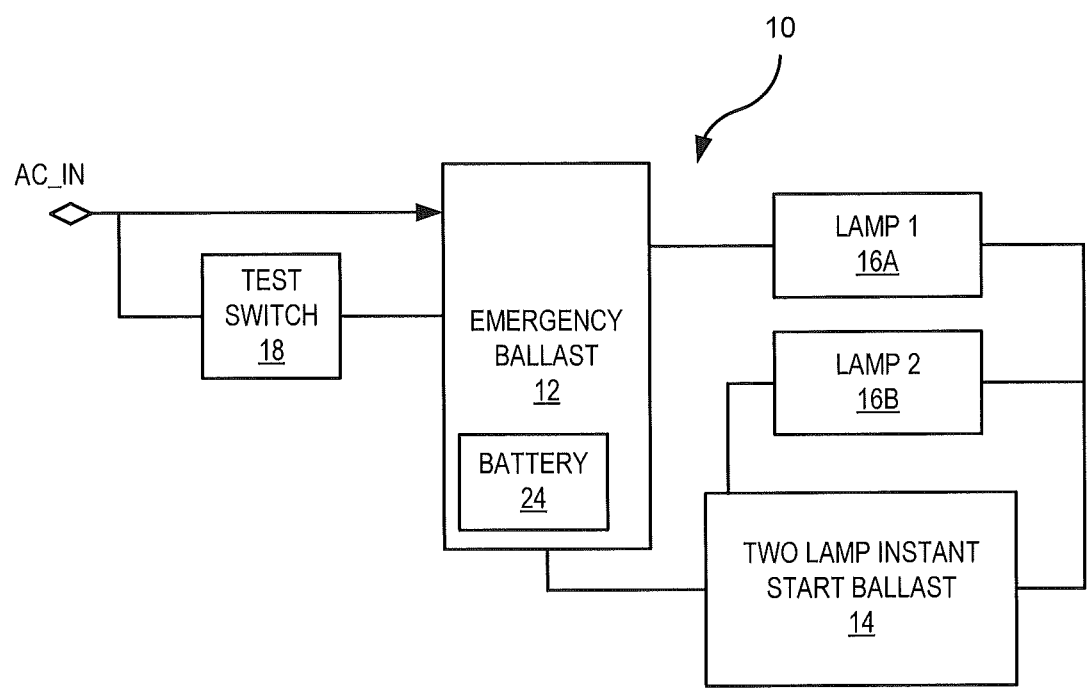
FIG. 1 is a schematic diagram of a conventional fluorescent lighting fixture with an emergency lighting ballast.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Recently, solid state luminaires that use light emitting diodes (LEDs) as light sources instead of fluorescent bulbs have been developed for general illumination. Emergency lighting systems may also be suitable for driving an LED load or device, such as a string of LEDs. These strings of LEDs may be driven by an LED driver under normal operation. When there is a loss or disruption of power to the string or strings of LEDs, an emergency lighting module, or an emergency LED driver controlled by an emergency lighting module operates in an emergency mode, according to an embodiment. The emergency LED driver supplies a current to the emergency lighting device, which is a string or strings of LEDs. A description of such an emergency module is provided below with the use of FIG. 3.

Figure 2:
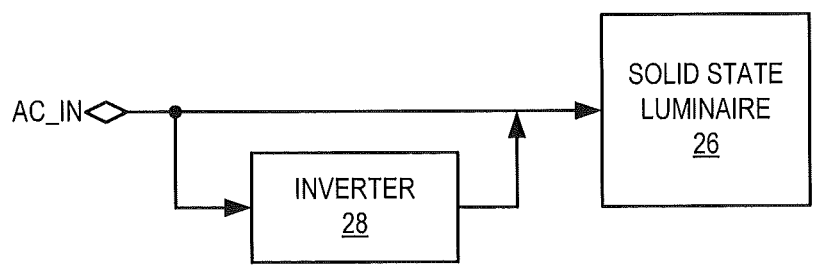
FIG. 2 is a schematic diagram of a solid state luminaire coupled to a power inverter.

Conventionally, emergency lighting for solid state luminaires has been handled through the use of a battery powered inverter connected to the luminaire. For example, as shown in FIG. 2, an inverter 28 is coupled to a solid state luminaire 26. The inverter includes a battery (not shown) that is charged by power received from an AC input (AC_IN) that also normally powers the luminaire 26. As is known in the art, an inverter generates a sine wave or quasi-sine wave AC output in response to a DC power signal, such as a DC signal generated by a battery. The inverter 28 monitors the input voltage AC_IN and supplies an AC signal to the luminaire 26 in the event the AC_IN voltage is removed. One drawback of this type of system is that the solid state luminaire 26 is unaware of the power outage, and will continue to run at its full lumen level. Thus, in order to meet applicable code requirements, the inverter must be capable of supplying enough power to run the luminaire 26 at its full lumen output level for the entire time period required by code. This undesirably increases the capacity requirements, and therefore the cost, of the battery.

Figure 3:
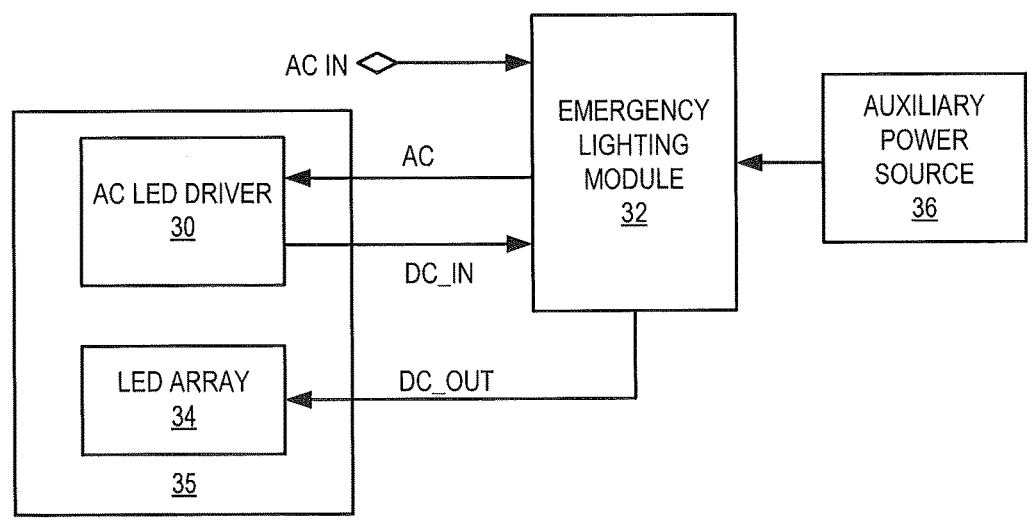
FIG. 3 is a schematic diagram of an emergency lighting module for a solid state luminaire according to some embodiments.

An emergency lighting module may provide DC power to a solid state luminaire and control operation of the luminaire in an emergency lighting mode. The module may also control dimming of the luminaire in a non-emergency mode. Referring to FIG. 3, an emergency lighting module 32 provides emergency power to a solid state luminaire 35. The emergency lighting module 32 connects directly to the LED array 34 of the luminaire 35 as well to an AC LED driver 30, and provides a DC voltage signal DC_OUT to the LED array 34. It will be appreciated that the emergency lighting module 32 and/or the AC LED driver 30 may be provided together with the LED array 34 as an integral part of an LED display or as separate components. Moreover, the LED array 34 may have any desired configuration and/or number of LEDs, including only a single LED.

In normal operation, an LED driver provides DC current to an LED array. In some cases, as power is typically supplied via AC lines, it must be converted to DC. Referring to an example diagram in FIG. 3, AC power is supplied via the AC_IN line. The AC power is passed to the AC LED driver 30, which generates a DC drive signal DC_IN that is passed to the LED array 34 through the emergency LED driver 32 over the DC_OUT line.

When the AC power supplied over the AC_IN input is interrupted, DC power is drawn from an auxiliary source 36, which may be a rechargeable battery pack, and passed to the LED array 34 over the DC_OUT line.

This configuration is an improvement over the configuration shown in FIG. 2 that uses an inverter to supply emergency AC power, as the emergency lighting module 32 can directly drive the LEDs with DC power at a lower current in the event of a power outage. However, in such a configuration, the emergency LED driver current is set at a fixed level. Thus, the lumen output of the luminaire 35 may vary depending on the configuration of the particular luminaire that the emergency module 32 is paired with. For example, if the luminaire 35 has 10 LEDs with a drive current of 1 amp, the lumen level output by the luminaire 35 during emergency operation will be different than the lumen output of a luminaire that has 10 LEDs with a drive current of 750 milliamps, because both luminaires would be run at the same reduced load current in emergency operation.

In various embodiments, the LED array(s) 34 may include single and/or multiple strings of white, red, and/or blue-shifted yellow (BSY) LEDs as described for example in U.S. Pat. No. 7,213,940, U.S. Pat. No. 7,768,192 and U.S. Pat. No. 8,029,155 the disclosures of which are incorporated by reference in their entirety. Various embodiments may also include, but are not limited to, one or more other non-white colors such as cyan, green, orange, blue, etc. These colors may also be included in combination with one or more strings of a second non-white color, which may be a blue light with a hue caused by lumiphors of another color, including but not limited to, yellow, cyan, green, orange, red, etc. (e.g., blue-shifted yellow (BSY), blue-shifted cyan, blue-shifted green, blue-shifted orange, etc.).

Figure 4:
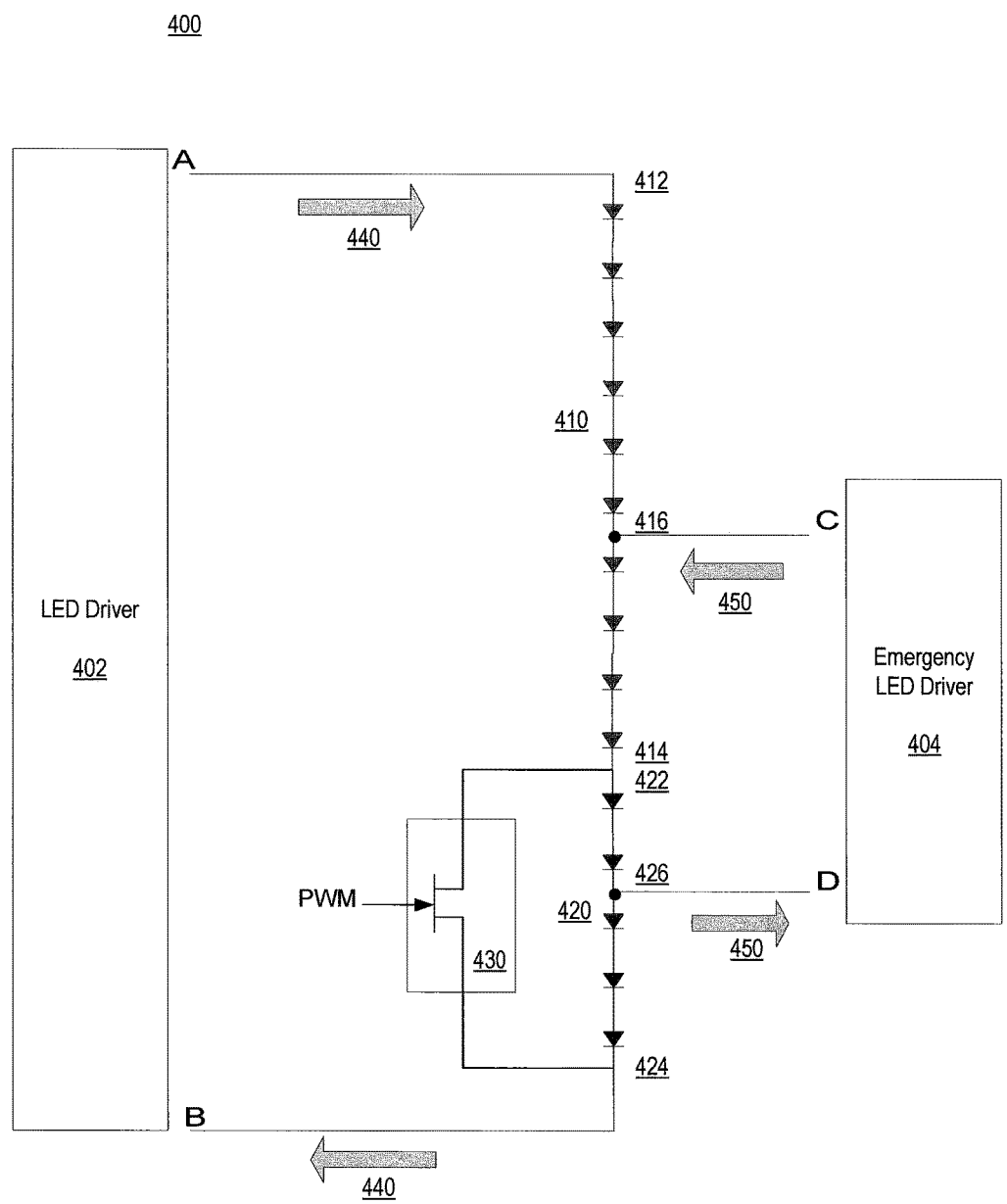
FIG. 4 is a diagram of an emergency lighting device according to some embodiments.

Emergency lighting modules, such as those described above, may be used with the emergency lighting device in diagram 400 of FIG. 4. FIG. 4 shows a first group or string 410 of solid state emitters or LEDs. First LED string 410 has an input end 412 and an output end 414. First LED string 410 is electrically connected in series to a second LED string 420, which has an input end 422 and an output end 424.

In this example emergency lighting device, a normal operation current 440 is received from LED driver 402 at input end 412 of the first LED string 410. Current 440 continues to the second LED string 420 and out the output end 424 of the second LED string 420. First string 410 may be one color while second string 420 may be another. Shunt circuitry 430 may be used to shunt current from second string 420 in order to adjust a color emitted from second string 420. Shunt Circuitry 430 may include a MOSFET, transistor or other shunt circuitry.

According to a further embodiment, first string 410 emits light of a non-white color, such as a blue-shifted yellow (BSY) color, and second string 420 emits light of a red color. The mixture of the light emitted from these two strings is a target white color with a more favorable color rendering index (CRI) than typical white lights. That is, the target white light provides more accurate color rendition of an object that reflects the light. These colors are discussed in previously incorporated U.S. Pat. Nos. 7,213,940, 7,768,192 and 8,029,155. The disclosures discuss wavelengths and coordinates on the 1931 CIE Chromaticity Diagram for the first and second colors and the target white color mixture. For example, the target white, according to an embodiment, may be defined as an area on a 1931 CIE Chromaticity Diagram enclosed by five line segments, connected by five points. The first point has x, y coordinates of 0.32 and 0.40, the second point 0.36 and 0.48, the third point 0.43 and 0.45, the fourth point 0.42 and 0.42 and the fifth point 0.36 and 0.38. In some cases, the CRI of the target white mixture is at least 80. In other cases, the CRI is 85 or greater. In some cases, the CRI is 90 or greater. In some cases, the CRI is 95 or greater.

In a further example, the BSY emitted light of the above embodiment may have dominant wavelengths from 430 nm to 480 nm with lumiphors having a dominant wavelength from 555 nm to 585 nm. Meanwhile, the red light emitted from the above embodiment may have a dominant wavelength from 600 nm to 630 nm.

In another example, other CIE coordinates of a target white mixture of light may include [0.32 and 0.40, 0.36 and 0.48, 0.41 and 0.455, 0.36 and 0.38]. Further descriptions of color wavelengths and target white CIE coordinates are provided in the incorporated patent disclosures.

In the embodiment of FIG. 4, emergency LED driver 404 supplies an emergency operation current 450 at emergency input 416 on the first string 410 that is output at the emergency output 426 on the second string 420. Current 450 may be provided upon a determination that the lighting device is operating in emergency mode. This emergency mode determination may be based on a loss, reduction, or disruption in current 440 to the emergency lighting device strings 410 and 420. Emergency LED driver 404, or the emergency lighting module controlling emergency LED driver 404, may detect this current change, as described above.

Emergency input 416 may be placed between input 412 and output 414 on first string 410. The position may be configured or adjusted in coordination with the location of the emergency output 426, located between the input end 422 and output end 424 of the second LED string 420. This coordination may provide for a mixture of light emitted in emergency mode that is similar to the mixture of light emitted by the two strings in normal operation. A ratio of the number of first string 410 lights to the number of the second string 420 lights may be configured based on a target mixture of light, such as a target white light, as explained above. In some cases, a ratio may include two BSY LEDs for every red LED. In further cases, the placement of an emergency input 416 and emergency output 426 may be determined in order to maintain this ratio. Although the ratio is the same, the total number of LEDs may be reduced. This may be necessary as the emergency LED driver 404 may supply a smaller emergency current 450 than normal operation current 440. For example, LED driver 402 may apply a DC voltage of 200V on the first and second strings 410 and 420 during normal operation. However, emergency LED driver 404, by nature of the stored battery power available after a mainline power loss during emergency operation, may apply only 30-40V across the emergency input 416 and emergency output 426.

In various embodiments, the emergency lighting device in diagram 400 may be configured so that the location of emergency input 416 and emergency output 426 are adjustable based upon a specification of an emergency LED driver 404. For instance, if an emergency LED driver pulled off the shelf had a certain voltage or power rating, the location of emergency input 416 and emergency output 426 may be selectable so as to meet certain light emission requirements or color and luminance targets with the emergency LED driver. In some cases, there may be multiple locations to select from. In other cases, emergency inputs and outputs may be mechanically or electrically adjusted to include any determined number of solid state emitters on each of the strings.

Figure 5:
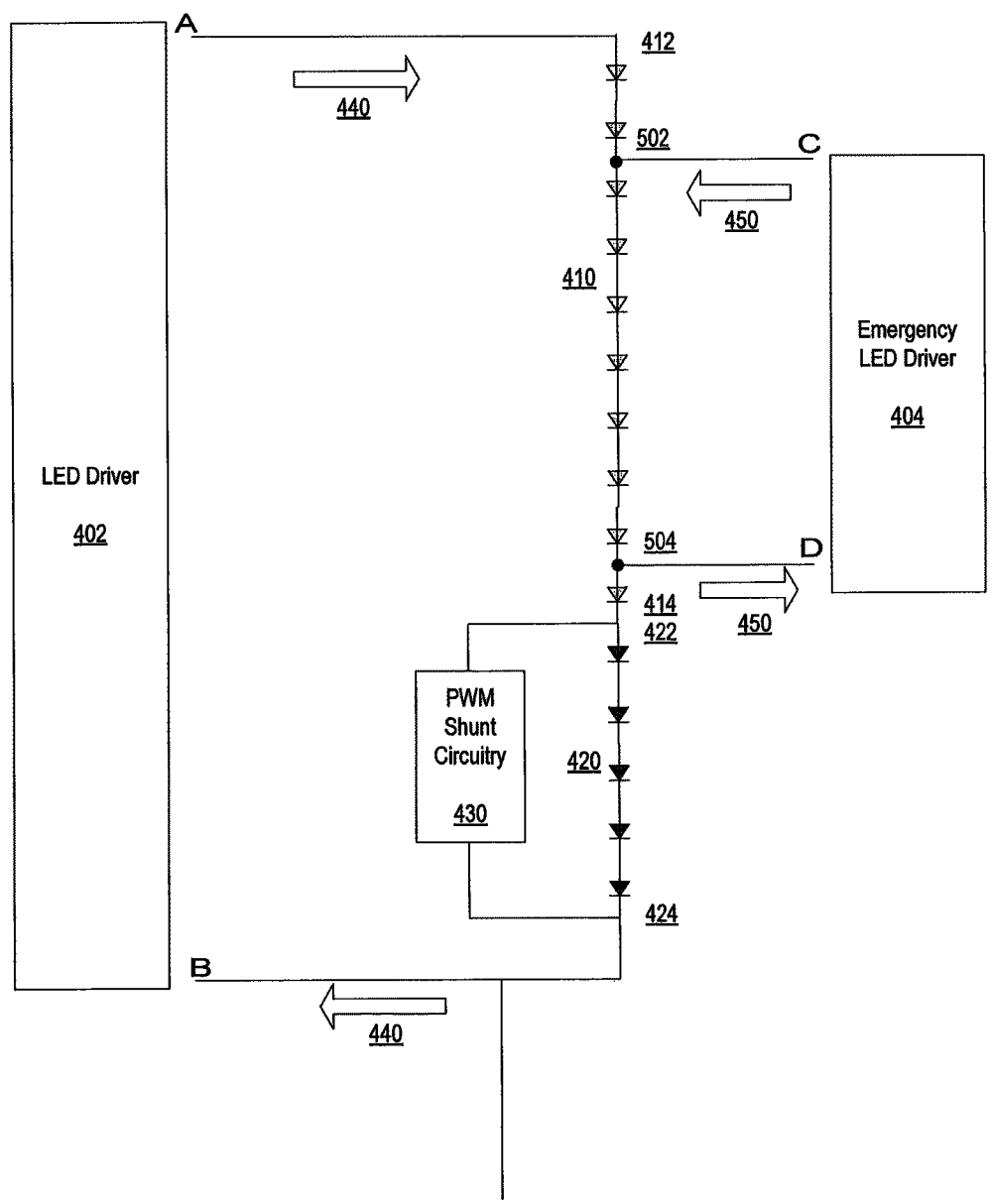
FIG. 5 is a diagram of another emergency lighting device according to some embodiments.

According to another embodiment, an emergency lighting device configuration is shown by diagram 500 in FIG. 5. The placement of the emergency input 502 and emergency output 504 may be reconfigured to both be located between the input end 412 and output end 414 of the first string 410. In other cases, both ends are located on second string 420.

In placing the emergency outputs, less LEDs may be used in order to match a lesser current 450 supplied by emergency LED driver 404. The number of LEDs, the ratio of LEDs and the location of the emergency input and output may be determined and adjusted based on the specifications of emergency LED driver 404. This may provide more flexibility with different emergency LED drivers, some of which may be designed for emergency lighting devices of diagrams 400 or 500 while other emergency LED drivers may be "off the shelf."

Figure 6:
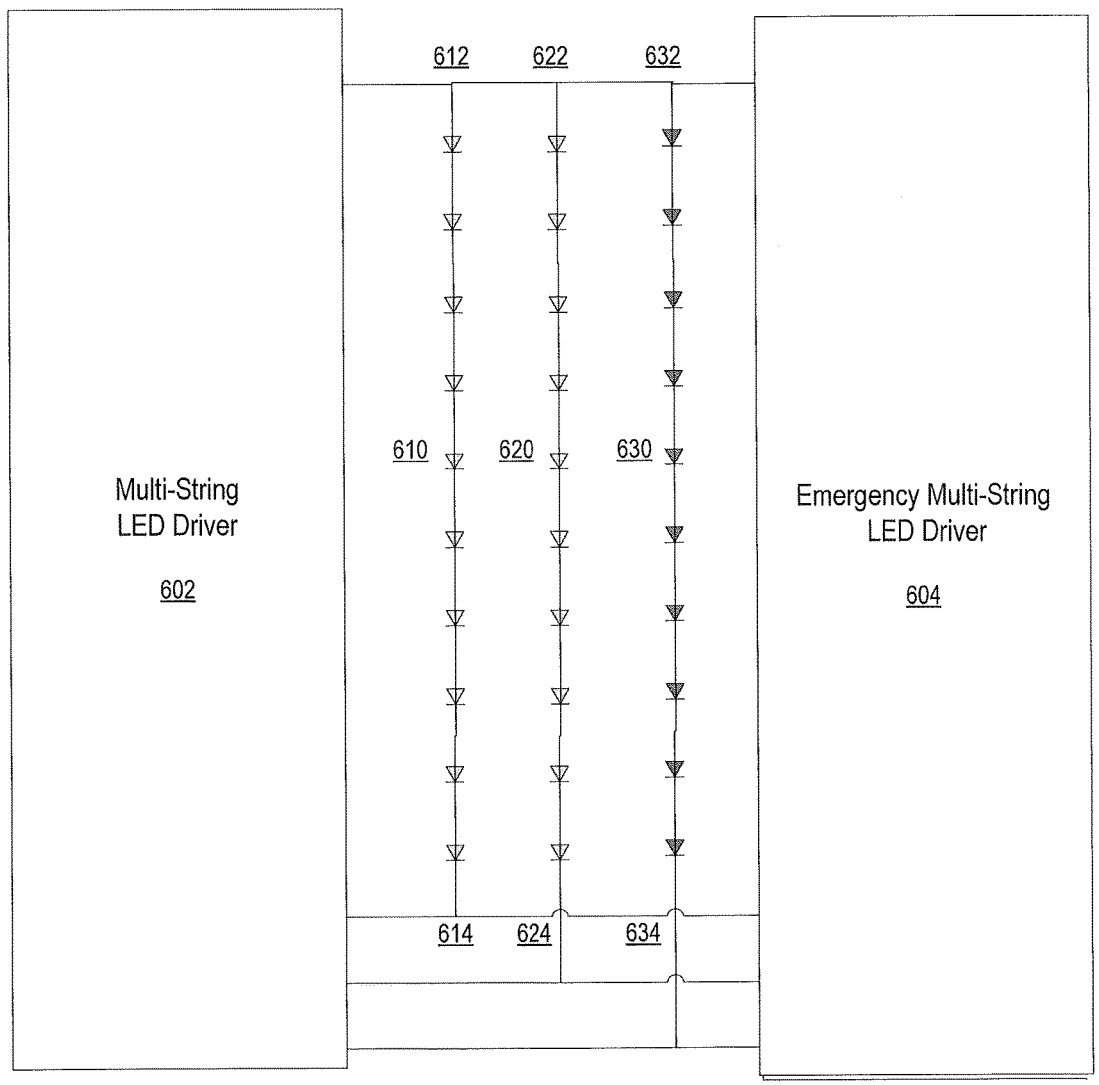
FIG. 6 is a diagram of a multi-string emergency lighting device according to embodiments.

FIG. 6 shows a multi-string emergency lighting device 600, according to an embodiment. The emergency lighting device includes multiple strings, such as first LED string 610 (input end 612 and output end 614), second LED string 620 (input end 622 and output end 624) and third LED string 630 (input end 632 and output end 634). Each string may be a different color. In other cases, some strings may share a color. For example, strings 610 and 620 may be emit a BSY light while string 630 may emit a red light, the resulting mixture or sub-mixture of emitted light achieving a target white color with a high CRI index of 80 or more.

In the example lighting device diagram 600, normal operation currents supplied to strings 610, 620 and 630 may be provided by multi-string LED driver 602. The strings may be controlled together or independently. Upon a determination of an emergency mode, strings 610, 620 and 630 may receive emergency operation currents from emergency multi-string LED driver 604. The supplied emergency operation current may be similar or less than the normal operation current. Currents may be supplied differently to different LED strings.

Figure 7:
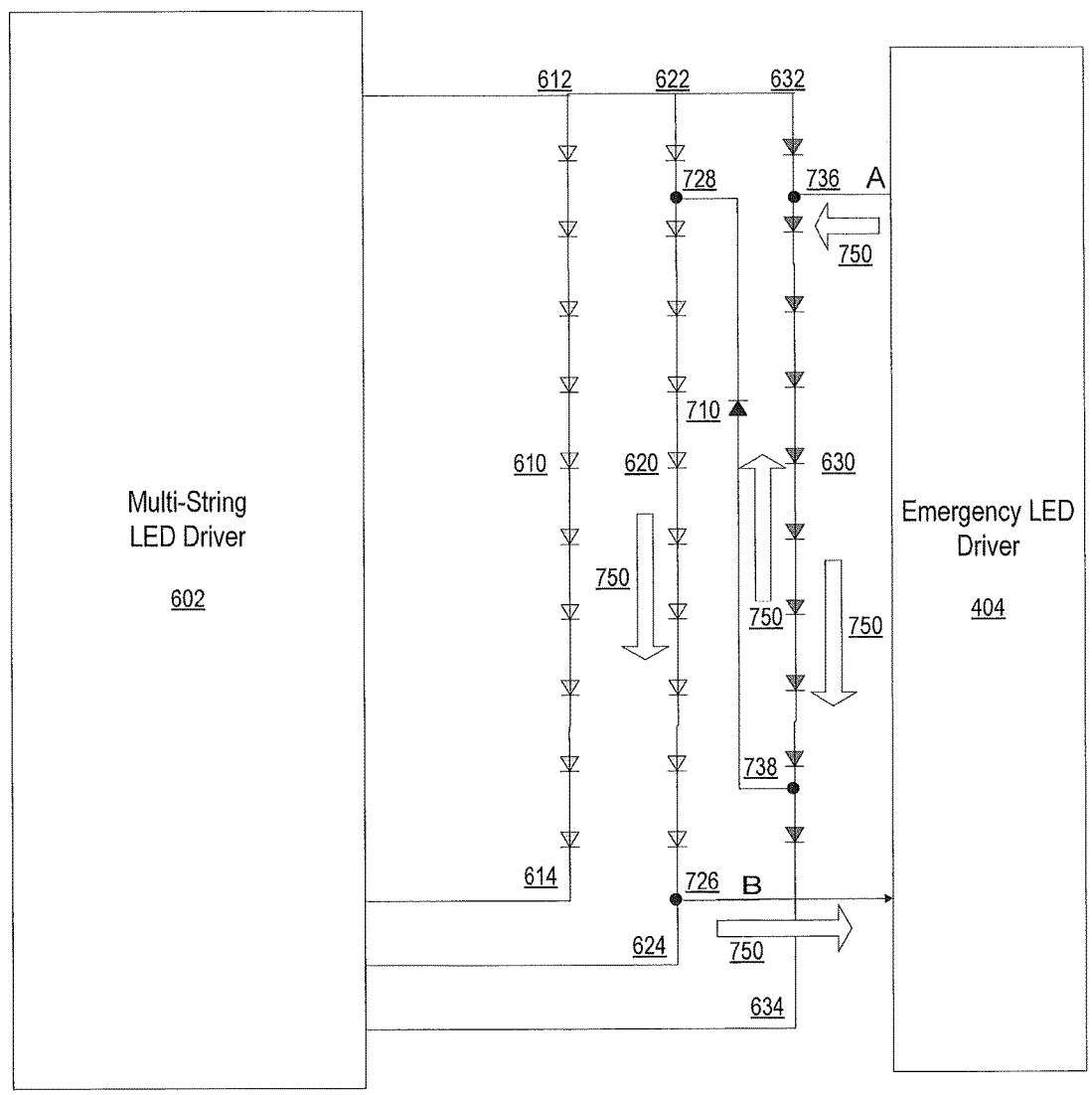
FIG. 7 is a diagram of another multi-string emergency lighting device according to some embodiments.

FIG. 7 shows emergency lighting device diagram 700, according to a further embodiment. In this example, a diode 710 is added to electrically connect string 620 and string 630. The anode of diode 710 is connected to third string 630 and the cathode of diode 710 is connected to second string 620 such that the normal operation current does not flow through the path of diode 710. In various embodiments, diode 710 is reverse biased, which is consistent with the polarity of the normal operation voltage applied to strings 610-630.

In emergency mode, emergency operation current 750 flows from emergency LED driver 404 into third string 630 at emergency input 736, through third string 630 and out at location 738, through diode 710 and into second string 620 at location 728, as shown by current arrows 750 in FIG. 7. Emergency operation current continues through second string 620 and out emergency output 726.

Note that even though FIG. 7 shows emergency operation current 750 flowing through second string 620 and third string 630, the lighting device of diagram 700 may be configured in other embodiments such that the current flows through any combination of strings 610-630. Also, although current 750 is shown by an arrow at different parts of the flow path, the amount of the current need not be exactly the same at each labeled point along the path. Current 750 is shown for purposes of explanation of where the current (or substantial portion) of the current flows.

The benefits of the configuration of the emergency lighting device of diagram 700 include the ability to power select strings of a multi-string arrangement during emergency operation. In some cases, strings 610-630 may be configured to emit different colors, and selecting different or fewer strings may purposely achieve an alternate target color due to the change in the mixture of light.

For example, strings 610 and 620 may be strings of BSY LEDs while string 630 is a string of red LEDs. The combination of the LEDs of the three strings 610-630 may then emit a mixture of light that presents a target white light with a higher CRI. Such a target white light may be defined by a CIE area within a polygon defined by line segments having endpoints at various defined CIE coordinates. Example coordinates are discussed above and also included in the patents incorporated above.

Therefore, in such embodiments, if in emergency mode, only one BSY and one red string are emitting light, the target light color may be of a lesser CRI or a different color. In emergency operation, CRI may be less of a concern. However, the remaining LED strings are able to still provide a similar color or a sufficiently white light.

Also, as shown in FIG. 7, in emergency mode, less LEDs are emitting light, reducing the power requirements. The ratio of LEDs in each string configured to emit light during emergency operation may be adjusted to maintain the same color as in normal operation. In the example above, one non-white, or BSY, string 620 and one red string 630 are emitting light in emergency mode. However, in a further embodiment, the locations of 736, 738, 728 and 726 may be configured such that the number of BSY LEDs included in the emergency operation current path 750 compared to the number of red LEDs included in the emergency operation current path 750 matches the ratio of total BSY and red LEDs included in the normal operation current path. In some examples, the ratio may be 2 BSY to 1 red. In other cases, the BSY:red ratio may be 3:2, 3:1, or 4:3. Other ratios may be considered.

Figure 8:
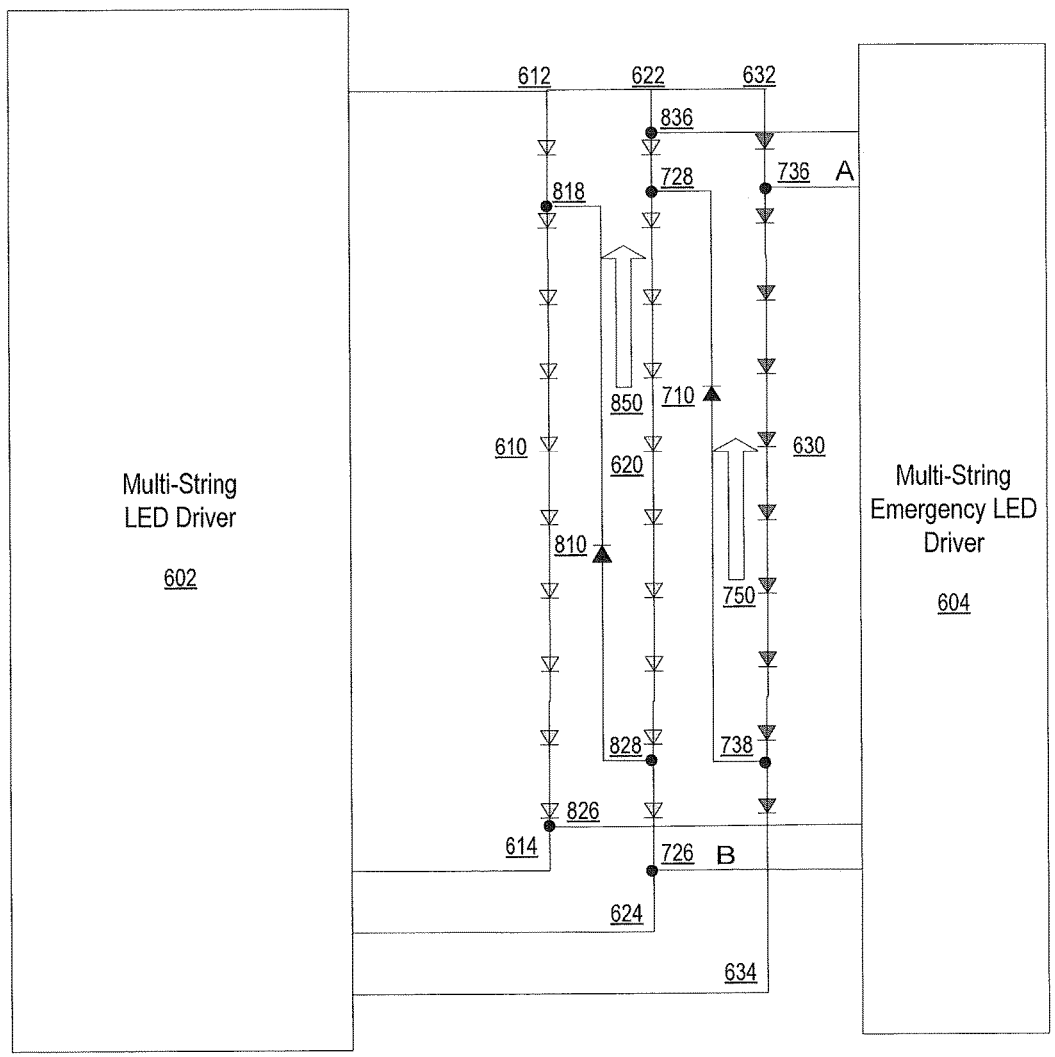
FIG. 8 is a diagram of a multi-string emergency lighting device according to a further embodiment.

FIG. 8 shows a diagram 800 illustrating a further embodiment of an emergency lighting device. In this example, a second diode 810 is added to electrically connect string 610 and string 620. The anode of diode 810 is connected to second string 620 and the cathode of diode 810 is connected to first string 610 such that the normal operation current does not flow through the path of diode 810. In various embodiments, diode 810 is also reverse biased, which is consistent with the polarity of the normal operation voltage applied to strings 610-630.

In emergency mode, multi-string emergency LED driver may drive a second emergency operation current 850 through the first and second strings 610 and 620 rather than the second and third strings 620 and 630. For example, current emergency operation current 850 may be received by second string 620 from emergency LED driver 604 at location 836. The emergency operation current flows through second string 620. Rather than leaving at emergency output 726, emergency operation current 850 continues through location 828, through diode 810 and into first string 610 at location 818, as shown by current arrow 850 in FIG. 8. Emergency operation current 850 continues through first string 610 and out emergency output 826.

The lighting device shown in diagram 800 may be configured to switch current between two pairs of strings to select different colors. In some cases, each of the three strings may be selected based upon a control of emergency LED driver 604. Different light patterns may be generated based on an alternating selection of the current paths. Different strings may also have different power requirements or ranges. Depending on the specifications of the emergency LED driver, different strings may be selected for use.

Figure 9:
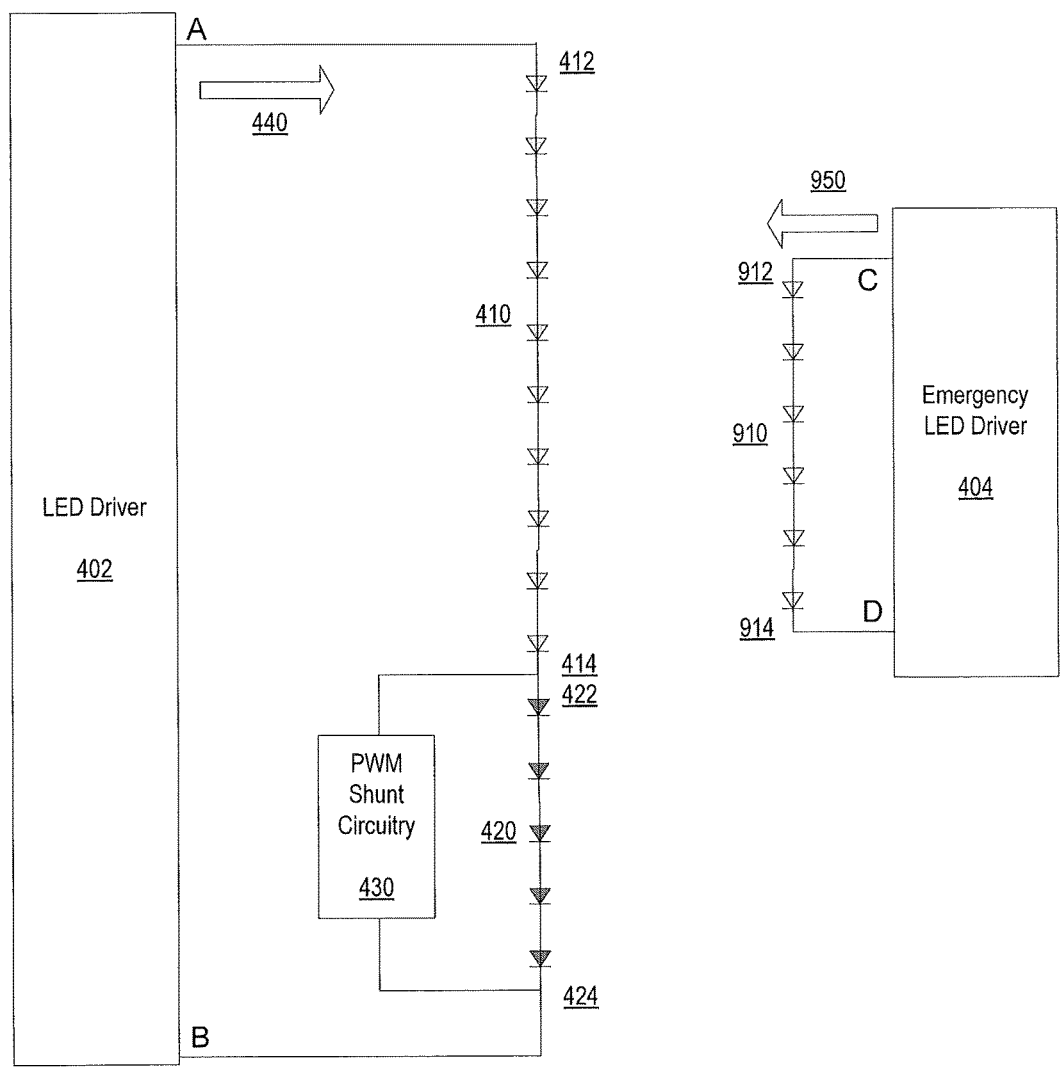
FIG. 9 is a diagram of an emergency lighting device according to embodiments.

FIG. 9 illustrates an emergency lighting device in diagram 900, according to an embodiment. In this embodiment, the lighting device includes strings 410 and 420. The device also includes LED string 910. Under normal operation, normal operation current 440 flows through string 410 and string 420. Under emergency operation, emergency operation current 950 flows through string 910. Emergency operation current 950 may flow into string 910 at emergency input 912 and out at emergency output 914. Emergency operation current 950 may cause string 910 to emit a different light than string 410, string 420 or the combination of string 410 and string 420. For example, strings 410 and 420 may combine to emit a target white color with a CRI of at least 80 while string 910 emits a white light with a CRI below 80 or even below 55. String 910 may also have fewer solid state emitters based on a potential configuration of emergency LED driver 404.

Figure 10:
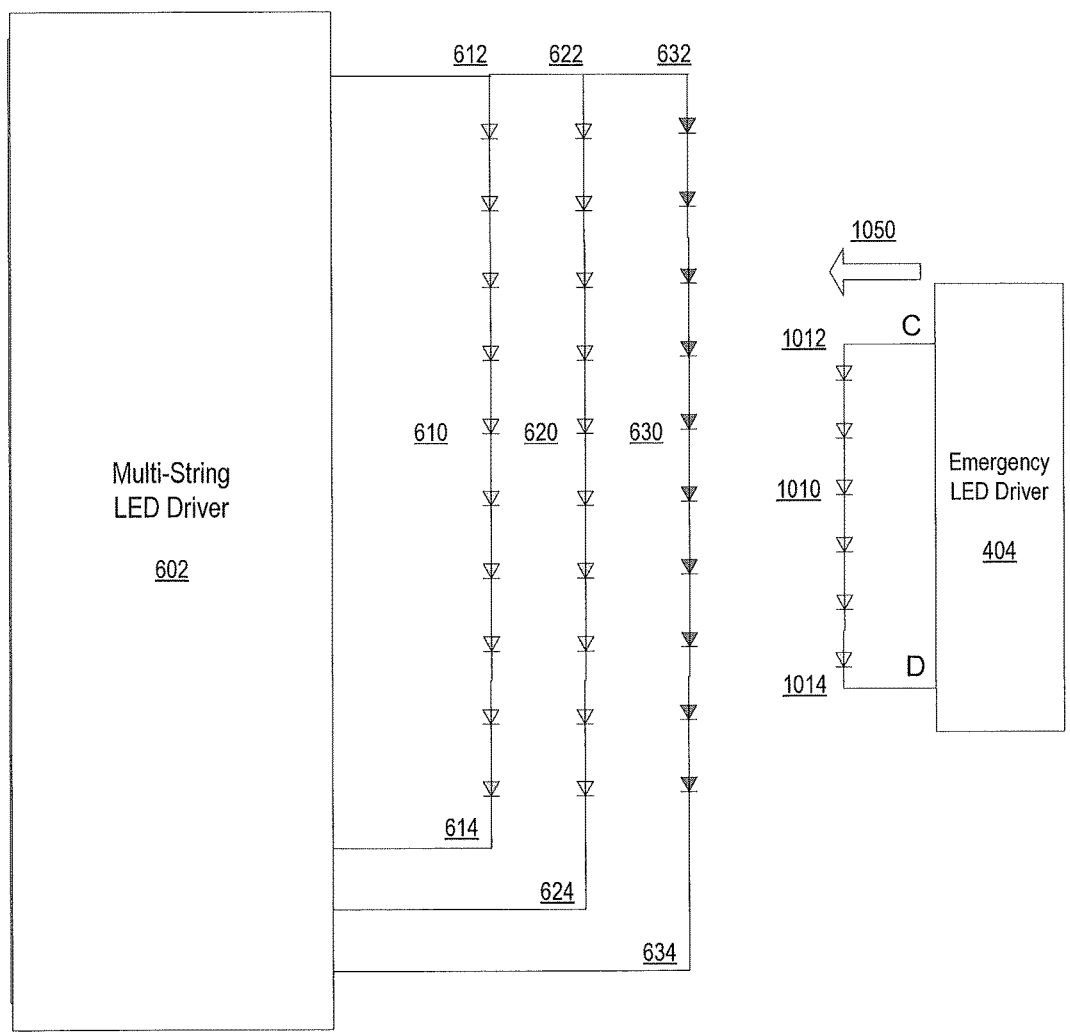
FIG. 10 is a diagram of a multi-string emergency lighting device according to embodiments.

FIG. 10 illustrates en emergency lighting device in diagram 1000, according to an embodiment. In this embodiment, the lighting device includes strings 610, 620 and 630. Under normal operation, normal operation current flows from multi-string LED driver 602 through strings 610, 620 and 630. Inputs 612, 622 and 632 may be electrically connected or strings 610, 620 and 630 may be separately controlled.

The example lighting device also includes LED string 1010. Under emergency operation, emergency operation current 1050 flows through string 1010. Emergency operation current 1050 may flow into string 1010 at emergency input 1012 and out at emergency output 1014. Emergency operation current 1050 may cause string 1010 to emit a different light than string 610, string 620, string 630, or any combination of strings 610-630. String 1010 may also have fewer solid state emitters based on a potential configuration of emergency LED driver 404.

Figure 11:
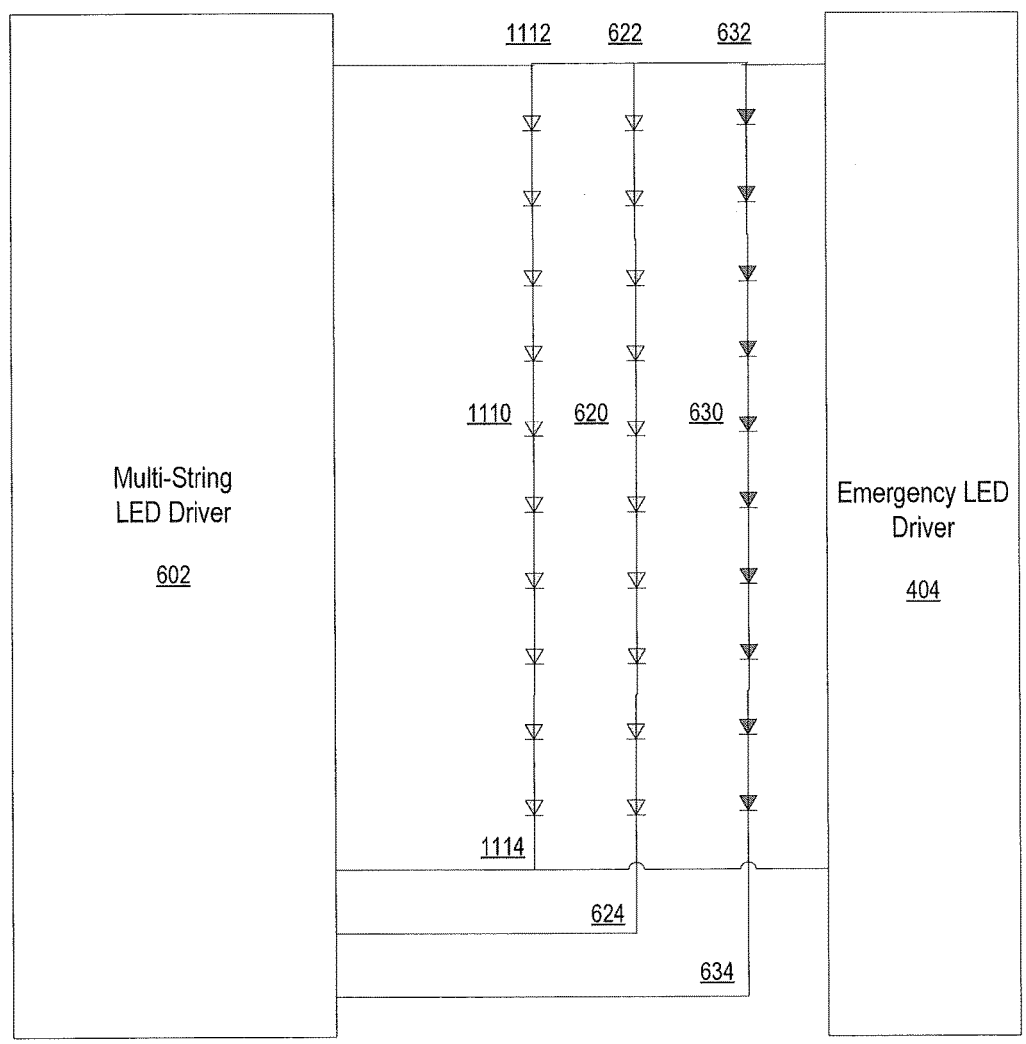
FIG. 11 is a diagram of a multi-string emergency lighting device according to embodiments.

FIG. 11 shows a multi-string emergency lighting device 1100, according to an embodiment. The emergency lighting device includes multiple strings, such as first LED string 1110 (input end 1112 and output end 1114), second LED string 620 (input end 622 and output end 624) and third LED string 630 (input end 632 and output end 634). Each string may be a different color. For example, under normal operation, string 620 emits a BSY light while string 630 emits a red light, the resulting mixture or sub-mixture of emitted light achieving a target white color with a high CRI. However, upon a determination of emergency mode, string 1110 may receive an emergency operation current from emergency LED driver 404. The supplied emergency operation current may be similar or less than the normal operation current. String 1110 may be configured to emit a white light of a lesser CRI value than the target white color emitted by the mixture of light from strings 620 and 630.

The different configurations of an emergency lighting device described above provide for mixtures of LED colors to emit a high CRI white light. The emergency lighting devices also provide for more flexibility in driver specifications. This flexibility allows for more interchangeability of emergency LED drivers. In some embodiments, a more advanced emergency LED driver or emergency module may be part of a configured emergency lighting device. In further cases, LED drivers may be part of the emergency lighting devices, in combination with an emergency LED driver.

Figure 12:
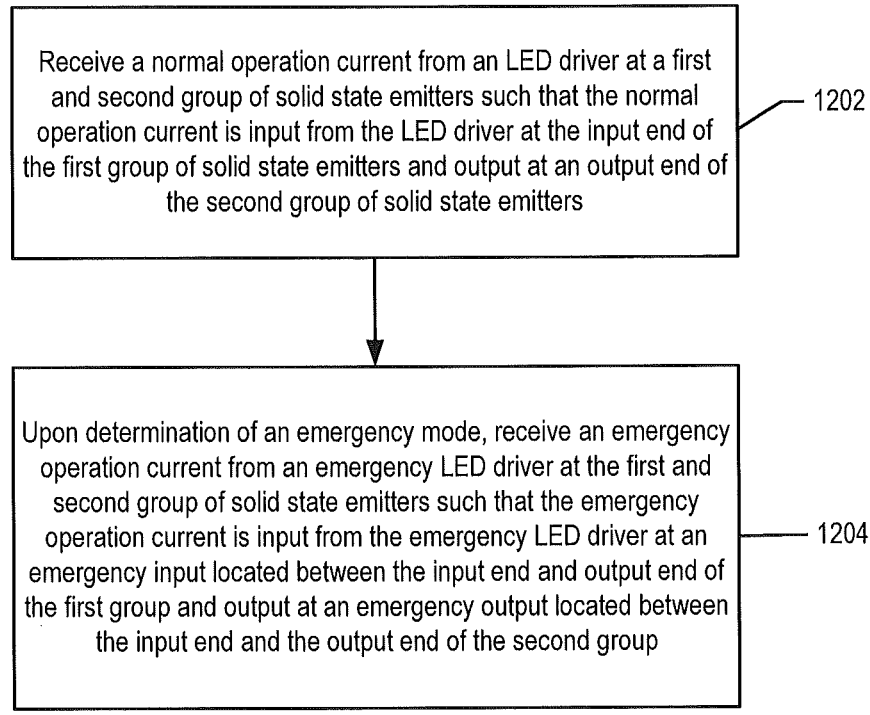
FIG. 12 is a flowchart that illustrates a method of operating an emergency lighting device according to some embodiments.

Methods of operating an emergency lighting device are also provided. FIG. 12 shows a flowchart of a method 1200 for operating an emergency lighting device, according to an embodiment. In this embodiment, a normal operation current is received from an LED driver at a first group of solid state emitters and a second group of solid state emitters such that the normal operation current is input from the LED driver at the input end of the first group of solid state emitters and output at an output end of the second group of solid state emitters (block 1202). An LED driver may be involved with this stage.

Upon determination of an emergency mode, an emergency operation current is received from an emergency LED driver at the first group of solid state emitters and the second group of solid state emitters such that the emergency operation current is input from the emergency LED driver at an emergency input located between the input end and the output end of the first group of solid state emitters and output at an emergency output located between the input end and the output end of the second group of solid state emitters (block 1204). In other cases, the emergency output may be located between the input end and output end of the first group. An emergency LED driver may be involved with this stage. This block may include determining that a normal operation current, voltage or power supplied to the lighting device has dropped below or failed to satisfy a threshold. When such a reduction is detected, the emergency operation mode may supplement or replace the reduction in current using an emergency LED driver. The LED driver may be notified to disable itself completely. As described above, an emergency module may use a microcontroller to switch to emergency operation mode. In other embodiments, rather than receiving the currents, a method may include supplying the normal operation current and emergency operation current.

Figure 13:
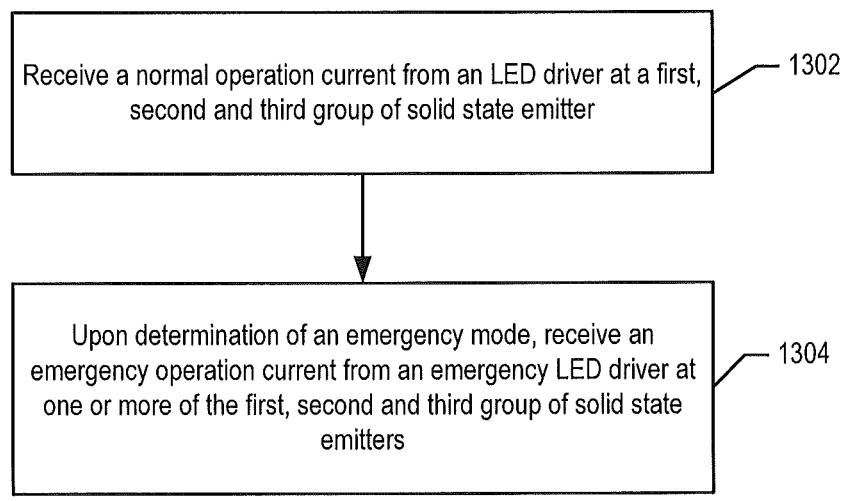
FIG. 13 is a flowchart that illustrates another method of operating an emergency lighting device according to other embodiments.

FIG. 13 shows another method 1300 for operating an emergency lighting device, according to an embodiment. A normal operation current is received from an LED driver at first, second and third groups of solid state emitters (block 1302). Upon determination of an emergency mode, an emergency operation current is received from an emergency LED driver at one or more of the first, second and third group of solid state emitters (block 1304). In some embodiments, a mixture of light emitted from the first second and third groups of solid state emitters produces a target white light under normal operation and a lower CRI or dimmer white light in emergency operation mode. In other cases, current is received from the emergency LED driver at a fourth and possibly separate group of solid state emitters. This fourth group may have light, perhaps white, with a CRI less than the target white light (may be at least CRI of 80).

Figure 14:
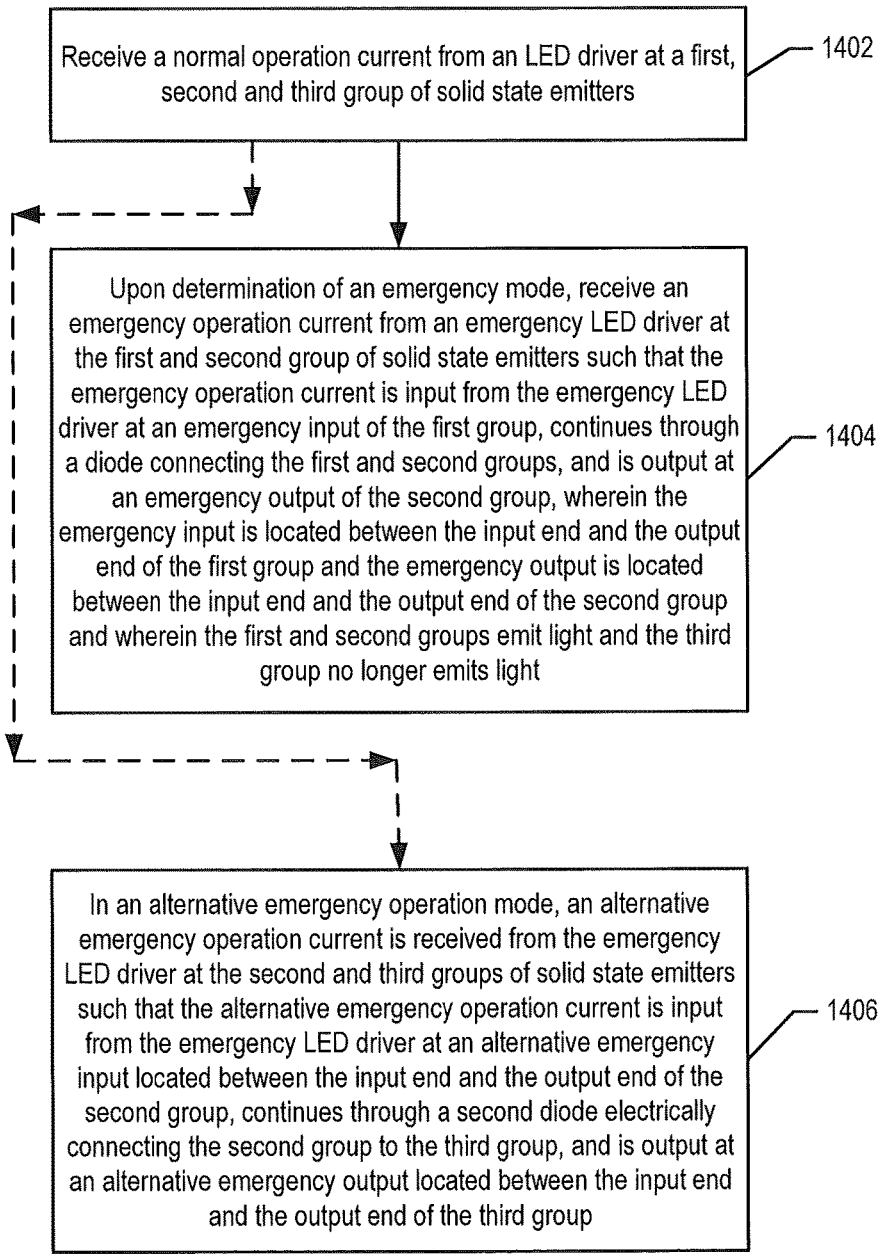
FIG. 14 is a flowchart that illustrates a method of operating an emergency lighting device according to some embodiments.

According to another embodiment, FIG. 14 shows a method 1400 for operating an emergency lighting device. A normal operation current is received from an LED driver at a first, second and third group of solid state emitters (block 1402). Upon determination of an emergency mode, an emergency operation current is received from an emergency LED driver at the first and second groups such that the emergency operation current is input from the emergency LED driver at an emergency input located between the input end and the output end of the first group. The emergency operation current continues through a diode electrically connecting the first group to the second group and is output at an emergency output located between the input end and the output end of the second group (block 1404).

According to a further embodiment, in an alternative emergency operation mode, an alternative emergency operation current is received from the emergency LED driver at the second and third groups of solid state emitters such that the alternative emergency operation current is input from the emergency LED driver at an alternative emergency input located between the input end and the output end of the second group, continues through a second diode electrically connecting the second group to the third group, and is output at an alternative emergency output located between the input end and the output end of the third group (block 1404). In some cases, the emergency lighting device may be configured to alternate between the emergency mode and alternative emergency mode so as to produce different color lights of varying durations. The alternating of strings may be slow, quick or follow certain patterns. In other cases, alternation may take place between two colors of a same string path.

The embodiments of emergency lighting devices described above provide more targeted lights with a greater flexibility to account for drivers of different specifications. Various combinations of colors may be used, including color mixtures that more efficiently provide a white color with a relatively high CRI.

Figure 15:
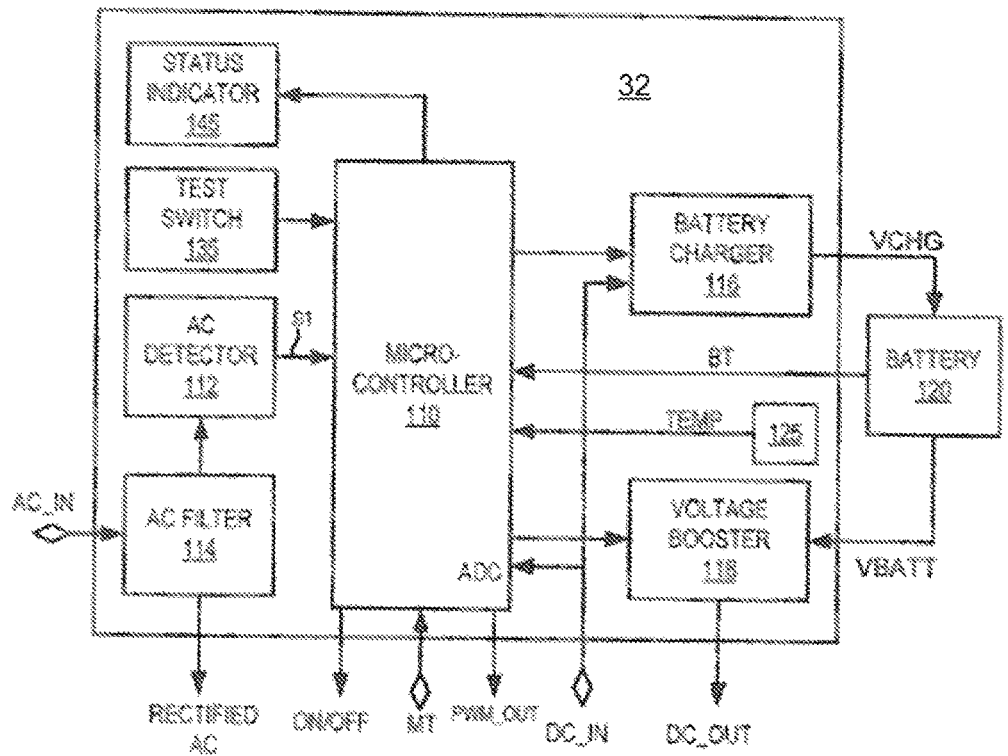
FIG. 15 is a detailed schematic diagram of an emergency lighting module according to some embodiments.

An emergency lighting module 32 according to some embodiments is illustrated in more detail in FIG. 15. As shown therein, the emergency lighting module 32 includes a microcontroller 110 that controls operations of the emergency lighting module 32.

The microcontroller 110 may include, but is not limited to, a programmable microcontroller, microprocessor, field programmable gate array, or other suitable circuitry. In particular, the microcontroller 110 may be a general purpose programmable microcontroller, such as a model MSP430 microcontroller manufactured by Texas Instruments.

A conventional AC filter 114 filters and rectifies an AC line voltage AC_IN. The rectified AC signal is output by the AC filter 114. An AC detector 112 is coupled to the AC filter 114 and detects the presence or absence of an AC input signal to the AC filter 114. An output of the AC detector 112 is provided to the microcontroller 110.

Figure 16:
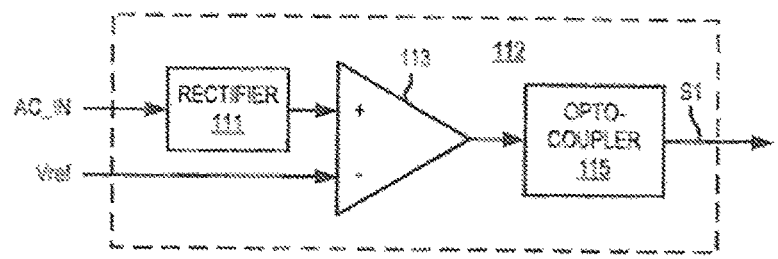
FIG. 16 is a block diagram of an AC detector according to some embodiments.

Brief reference is made to FIG. 16, which illustrates an AC detector 112 according to some embodiments in more detail. As shown therein, the AC detector may include a rectifier circuit 11 having an input coupled to the AC filter 114 and an output coupled to a comparator 113 that drives an opto-coupler 115 for providing a signal Si that is indicative of the AC line voltage. The opto-coupler 115 output will pulse at the line frequency rate as long as the AC voltage magnitude is above a predetermined cutoff level Vref. When the AC voltage drops below the cutoff level, the comparator 113 output becomes static, and no further pulses are generated through the opto-coupler 115. The microcontroller 110 monitors the opto-coupler output signal for activity. If the opto-coupler output stops producing transitions at the line frequency, the microcontroller 110 may detect this as a loss of AC signal.

Referring again to FIG. 15, the microcontroller 110 is also coupled to a battery charger 116 and a voltage booster 118, and controls operations thereof. A DC input is provided to the battery charger 116, while a DC output voltage DC_OUT is provided by the voltage booster 118. The volatile and non-volatile memory requirements for the microcontroller 110 may be fulfilled with internal and/or external circuitry. The digital controller may use internal and/or external devices to convert analog and digital input/output signals.

A battery 120 is coupled to the microcontroller 110, the battery charger 116 and the voltage booster 118. The battery 120 may be a rechargeable battery, which may in some embodiments include a lithium-iron-phosphate (LiFePO$_4$) rechargeable battery cell. Other types of battery technologies may be use, including, without limitation, NiCd, NiMH, lead-acid, etc. The battery 120 may be provided externally to the emergency lighting module 32 as illustrated in FIG. 4, or may be integrated within the emergency lighting module 32.

The battery 120 provides a battery type signal BT that indicates the type of battery that is connected to the emergency lighting module 32. The microcontroller 110 may use this information to determine the battery type, voltage and/or capacity (e.g., in milliamp-hours) of the battery 120.

The battery 120 and/or the emergency lighting module 32 may include a temperature sensor 125 that provides a temperature signal TEMP that is representative of the temperature of the battery 120 to the microcontroller 110. The temperature of the battery 120 may be used by the microcontroller to improve the safety of the battery packs and also to improve charging performance. Using the temperature information it may be possible for the microcontroller 110 to tailor charging and discharging functions to increase efficiency for a given temperature. The microcontroller 110 may also disable the battery pack 120 in response to a temperature sensed by the temperature sensor 125 in the event of a malfunction.

Referring again to FIG. 15, the microcontroller 110 has an input for a test switch and an output for battery status. The microcontroller 110 also generates the ON/OFF control and PWM_OUT dimming signals described above.

The microcontroller 110 is configured to monitor the status of the AC detector 112, and, in response to a detected loss of AC input power, cause the voltage booster 118 to generate a DC output voltage DC_OUT to be supplied to the LED control module 50. The microcontroller 110 also controls the level of light output by the solid state luminaire 70 by means of a PWM_OUT dimming signal.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. An emergency lighting device comprising:
   a first group of solid state emitters connected in a first string and configured to emit light of a first color, the first group of solid state emitters having an input end and an output end;
   a second group of solid state emitters connected in a second string and configured to emit light of a second color, the second group of solid state emitters having an input end and an output end, wherein the input end of the second group of solid state emitters is electrically connected in series to the output end of the first group of solid state emitters;
   wherein the first group of solid state emitters is configured to receive a normal operation current at the input end of the first group of solid state emitters, and the second group of solid state emitters is configured to output the normal operation current at the output end of the second group of solid state emitters; and
   wherein the first group of solid state emitters is configured to receive an emergency operation current at an emergency input that is different from the input end of the first group of solid state emitters and output the emergency operation current at an emergency output, wherein the emergency input and the emergency output are located between the input end of the first group of solid state emitters and the output end of the second group of solid state emitters such that the emergency operation current is supplied to a first plurality of the first group of solid state emitters and not to a second plurality of the first group of solid state emitters,
   wherein the first color is different than the second color.

2. The emergency lighting device of claim 1, wherein the emergency input and the emergency output are located between the input end and the output end of the first group of solid state emitters such that the first group of solid state emitters emits light of the first color and the second group of solid state emitters emits no light such that the emergency lighting device emits light of the first color rather than a mixture of the first color and the second color.

3. The emergency lighting device of claim 1, wherein the emergency input is located between the input end of the first group of solid state emitters and the output end of the first group of solid state emitters, and wherein the emergency output is located between the input end of the second group of solid state emitters and the output end of the second group of solid state emitters such that the emergency operation current is supplied to a first plurality of the second group of solid state emitters and not to a second plurality of the second group of solid state emitters in response to the normal operation current.

4. The emergency lighting device of claim 3, wherein the first group of solid state emitters is configured to emit a first non-white light and the second group of solid state emitters is configured to emit a second non-white light.

5. The emergency lighting device of claim 4, wherein a ratio of a number of solid state emitters of the first group of solid state emitters between the emergency input and the output of the first group of solid state emitters to a number of solid state emitters of the second group of solid state emitters between the input end of the second group of solid state emitters and the emergency output is configured to emit a mixture of light of a target color that is different from a nominal color of combined light emitted by the first group of solid state emitters and the second group of solid state emitters.

6. The emergency lighting device of claim 5, wherein the first group of solid state emitters is configured to emit blue shifted yellow (BSY) light, the second group of solid state emitters is configured to emit red light and the ratio is configured such that the target color is a white light with a Color Rendering Index (CRI) of at least 80.

7. The emergency lighting device of claim 4, wherein a ratio of a number of solid state emitters of the first group of solid state emitters between the emergency input and the output of the first group of solid state emitters to a number of solid state emitters of the second group of solid state emitters between the input end of the second group of solid state emitters and the emergency output is configured to emit a mixture of light of a target color that is different from the first color of the first group of solid state emitters and the second color of the second group of solid state emitters.

8. The emergency lighting device of claim 3, wherein a number of solid state emitters of the first group of solid state emitters between the emergency input and the output of the first group of solid state emitters and a number of solid state emitters of the second group of solid state emitters between the input end of the second group of solid state emitters and the emergency output are configured based on an available emergency current.

9. The emergency lighting device of claim 1, wherein the locations of the emergency input and emergency output are mechanically adjustable.

10. A method of operating an emergency lighting device, comprising:
  receiving a normal operation current at a first group of solid state emitters and a second group of solid state emitters such that the normal operation current is input at an input end of the first group of solid state emitters and output at an output end of the second group of solid state emitters;
  detecting a loss of input power to the emergency lighting device; and
  upon the loss of the input power, supplying an emergency operation current at an emergency input that is different from the input end of the first group of solid state emitters and outputting the emergency operation current at an emergency output,
  wherein the emergency input and the emergency output are located at respective locations between the input end of the first group of solid state emitters and the output end of the second group of solid state emitters,
  wherein the respective locations are different from the input end of the first group of solid state emitters and the output end of the second group of solid state emitters, and
  wherein the first group of solid state emitters is configured to emit light of a first color, and the second group of solid state emitters is configured to emit light of a second color, different from the first color.

11. The method of claim 10, wherein the emergency input and the emergency output are located between the input end and an output end of the first group of solid state emitters.

12. The method of claim 10, wherein the receiving an emergency operation current comprises receiving a current that is less than the normal operation current.

13. The method of claim 10, wherein the emergency input is located between the input end of the first group of solid state emitters and the output end of the first group of solid state emitters, and wherein the emergency output is located between the input end of the second group of solid state emitters and the output end of the second group of solid state emitters.

14. The method of claim 13, wherein the receiving an emergency operation current causes the first group of solid state emitters and the second group of solid state emitters to maintain a color emitted with the normal operation current.

15. The method of claim 13, further comprising adjusting a ratio of a number of solid state emitters of the first group of solid state emitters between the emergency input and the output of the first group of solid state emitters to a number of solid state emitters of the second group of solid state emitters between the input of the second group of solid state emitters and the emergency output to emit a mixture of light of a target color.

16. The method of claim 13, further comprising adjusting a number of solid state emitters of the first group of solid state emitters between the emergency input and the output of the first group of solid state emitters and a number of solid state emitters of the second group of solid state emitters between the input of the second group of solid state emitters and the emergency output based on an available emergency current.

17. The method of claim 13, further comprising adjusting a ratio of a number of solid state emitters of the first group of solid state emitters between the emergency input and the output of the first group of solid state emitters to a number of solid state emitters of the second group of solid state emitters between the input of the second group of solid state emitters and the emergency output to emit a mixture of light of a target color that is different from the first color of the first group of solid state emitters and the second color of the second group of solid state emitters.

18. The method of claim 10, wherein the locations of the emergency input and emergency output are mechanically adjustable.

19. An emergency lighting device comprising:
  a first group of solid state emitters connected in a first string and configured to emit a light of a first color, the first group of solid state emitters having a first input end and a first output end;
  a second group of solid state emitters connected in a second string and configured to emit a light of a second color, the second group of solid state emitters having a second input end and a second output end;
  a third group of solid state emitters connected in a third string and configured to emit a light of a third color, the third group of solid state emitters having a third input end and a third output end, wherein the first, second and third groups of solid state emitters are electrically connected to a first current input at the first, second and third input ends;
  a second current input having an anode coupled to the first string between first and second ones of the first group of solid state emitters and a cathode coupled to the second string between first and second ones of the second group of solid state emitters; and
  a diode having an anode coupled to the first string between third and fourth ones of the first group of solid state emitters and a cathode coupled to the second string between third and fourth ones of the second group of solid state emitters.

20. The emergency lighting device of claim 19, wherein the first color and the second color are the same color.

21. The emergency lighting device of claim 19, wherein the first color and the second color are different colors.

22. The emergency lighting device of claim 21, wherein the second color and the third color are different colors.

23. The emergency lighting device of claim 22, wherein the second current input and the diode are configured such that a mixture of light emitted by the first and second groups of solid state emitters in response to an emergency current applied at the second current input is a target color that is different from a nominal color of light emitted by the first, second and third groups of solid state emitters in response to a normal current supplied at the first current input.

24. The emergency lighting device of claim 19, wherein a current through each of the first, second and third groups of solid state emitters is controlled by an LED driver during normal operation such that at least the first color and the second color mix to provide a target white color with a Color Rendering Index (CRI) of at least 80, and the third group of solid state emitters is controlled by an emergency LED driver in an emergency operation to emit a light with a CRI less than the CRI of the target white color.

25. A method of operating an emergency lighting device, comprising:
  receiving a normal operation current at a first group of solid state emitters, a second group of solid state emitters and a third group of solid state emitters; and upon loss of the normal operation current, receiving an emergency operation current at the first group of solid state emitters and the second group of solid state emitters such that the emergency operation current is input at an emergency input located between an input end and an output end of the first group of solid state emitters, continues through a diode electrically connecting the first group of solid state emitters to the second group of solid state emitters, and is output at an emergency output located between the input end and the output end of the second group of solid state emitters;

wherein the receiving the emergency operation current further comprises receiving, in an alternative emergency operation mode, an alternative emergency operation current at the second group of solid state emitters and the third group of solid state emitters such that the alternative emergency operation current is input at an alternative emergency input located between the input end and the output end of the second group of solid state emitters, continues through a second diode electrically connecting the second group of solid state emitters to the third group of solid state emitters, and is output at an alternative emergency output located between the input end and the output end of the third group of solid state emitters.

26. An emergency lighting device comprising:

a first group of solid state emitters configured to receive a normal operation current and to responsively emit light of a first color having a first input end and a first output end;

a second group of solid state emitters configured to receive the normal operation current and to responsively emit light of a second color different than the first color having a second input end and a second output end, wherein the first group of solid state emitters and the second group of solid state emitters emit a mixture of light that is a target white color with a Color Rendering Index (CRI) of at least 80; and a third group of solid state emitters configured to receive an emergency operation current upon loss of the normal operation current and emit a light with a CRI less than the CRI of the target white color, wherein the first and second groups of solid state emitters are not configured to receive the emergency operation current.

27. The emergency lighting device of claim 26, wherein the second input end of the second group of solid state emitters is electrically connected in series to the first output end of the first group of solid state emitters, and wherein the first group of solid state emitters is configured to receive the normal operation current at the first input end of the first group of solid state emitters and the second group of solid state emitters is configured to output the normal operation current at the second output end of the second group of solid state emitters.

28. The emergency lighting device of claim 26, further comprising a fourth group of solid state emitters configured to emit a light of a fourth color having a fourth input end and a fourth output end, wherein the first, second and fourth groups of solid state emitters are electrically connected at the first, second and fourth input ends to an LED driver, and wherein a current through each of the first, second and fourth groups of solid state emitters is controlled by the LED driver during normal operation such that at least two of the first, second and fourth groups of solid state emitters emit a mixture of light that is the target white color with a CRI of at least 80.

* * * * *

UNITED STATES PATENT AND TRADEMARK OFFICE
CERTIFICATE OF CORRECTION

PATENT NO. : 9,871,404 B2  
APPLICATION NO. : 13/676791  
DATED : January 16, 2018  
INVENTOR(S) : McBryde et al.

Page 1 of 1

It is certified that error appears in the above-identified patent and that said Letters Patent is hereby corrected as shown below:

In the Specification

Column 14, Line 36: Please correct "rectifier circuit 11" to read -- rectifier circuit 111 --

Signed and Sealed this
Twenty-seventh Day of March, 2018

Andrei Iancu
*Director of the United States Patent and Trademark Office*